(12) United States Patent
Ruhfus et al.

(10) Patent No.: US 12,037,515 B2
(45) Date of Patent: Jul. 16, 2024

(54) COMPOSITIONS FOR USE IN OPTICAL MEASUREMENT TECHNOLOGY APPLICATIONS

(71) Applicant: F2MB-Engineering UG (haftungsbeschränkt), Dortmund (DE)

(72) Inventors: Max Michael Ruhfus, Dortmund (DE); Max Bruno Liese, Cologne (DE); Friedrich August Schlott, Recklinghausen (DE); Sebastian Gell, Cologne (DE)

(73) Assignee: F2MB-Engineering UG (haftungsbeschränkt), Dortmund (DE)

( * ) Notice: Subject to any disclaimer, the term of this patent is extended or adjusted under 35 U.S.C. 154(b) by 593 days.

(21) Appl. No.: 17/290,295

(22) PCT Filed: Nov. 4, 2019

(86) PCT No.: PCT/EP2019/080073
§ 371 (c)(1),
(2) Date: Apr. 30, 2021

(87) PCT Pub. No.: WO2020/089481
PCT Pub. Date: May 7, 2020

(65) Prior Publication Data
US 2021/0371680 A1    Dec. 2, 2021

(30) Foreign Application Priority Data
Nov. 2, 2018    (EP) .................... 18204110

(51) Int. Cl.
*C09D 7/20*    (2018.01)
*C09D 5/00*    (2006.01)
*C09D 7/63*    (2018.01)

(52) U.S. Cl.
CPC ............. *C09D 7/20* (2018.01); *C09D 5/006* (2013.01); *C09D 7/63* (2018.01)

(58) Field of Classification Search
CPC ... C08K 3/04; C08K 5/01; C09D 5/00; C09D 5/006; C09D 7/20; C09D 7/61; C09D 7/63
See application file for complete search history.

(56) References Cited

U.S. PATENT DOCUMENTS

| | | |
|---|---|---|
| 4,301,043 A | 11/1981 | Sato et al. |
| 2013/0244199 A1 | 9/2013 | Lu et al. |
| 2017/0320792 A1 * | 11/2017 | Leitch ...................... C07C 2/58 |

FOREIGN PATENT DOCUMENTS

| | | |
|---|---|---|
| EP | 1637187 A1 | 3/2006 |
| EP | 2829328 A1 | 1/2015 |
| EP | 2829329 A1 | 1/2015 |
| JP | S5381633 A | 7/1979 |
| JP | 1-283236 A * | 11/1989 |
| RU | 2541945 C1 | 2/2015 |
| WO | 2013139767 A2 | 9/2013 |
| WO | 2017029168 A1 | 2/2017 |

OTHER PUBLICATIONS

Reiser et al., "Adamantane and Diamantine; phase diagrams, Solubilities, and Rates of Dissolution", 1996, Fluid Phase Equilibria, vol. 117, Issue 1, pp. 160-167.
Schleyer et al., "Adamantane", 1962, Organic Syntheses, vol. 42, p. 8.

* cited by examiner

*Primary Examiner* — Anthony J Green
(74) *Attorney, Agent, or Firm* — The Webb Law Firm

(57) ABSTRACT

The present invention relates to novel compositions suitable for use in, inter alia, optical measurement technology applications and, in particular, 3D scanning technology as well as methods for the manufacture and methods of use of said compositions.

19 Claims, 6 Drawing Sheets

COMPOSITIONS FOR USE IN OPTICAL MEASUREMENT TECHNOLOGY APPLICATIONS

CROSS-REFERENCE TO RELATED APPLICATIONS

This application is the United States national phase of International Application No. PCT/EP2019/080073 filed Nov. 4, 2019, and claims priority to European Patent Application No. 18204110.3 filed Nov. 2, 2018, the disclosures of which are hereby incorporated by reference in their entirety.

BACKGROUND

Field of the Invention

The present invention relates to novel compositions suitable for use in, inter alia, optical measurement technology applications and, in particular, 3D scanning technology as well as methods for the manufacture and methods of use of said compositions.

Description of Related Art

The quality of an optical measurement is largely determined by the light properties of the surfaces of the objects to be measured. Frequently, a diffuse light reflection on the outer boundary surfaces of the measurement object is desired. In the case that the surface of the object to be measured is partly or completely transparent, translucent, absorbing, reflective, glossy, or black most currently available measurement devices struggle to produce a measurement/scan of sufficiently high quality and accuracy. Attempts to compensate for these deficiencies by, for example, adapting the light source, sensor and optical image to the properties of the object often prove ineffective or insufficient in providing optimal imaging of the desired quality. Furthermore, measuring and positioning strategies designed to avoid erroneous measurements or to reduce artefacts not only require expert knowledge, but are often also time-consuming and technically demanding.

In order to prepare surfaces for an optical 3D scan measurement which would otherwise be either incapable of being measured or difficult to accurately measure, one approach known in the art is to apply an antireflective coating to the surface to be measured, thus rendering said surface opaque or matt. In order that an optimal surface for scanning and thus minimal measurement errors during the scan are obtained, it is important that a coating layer of minimal yet homogenous thickness be applied.

One such approach sees the application to the surface to be measured/scanned of pigment-containing agents, in particular whitening agents based on inorganic pigments such as, for example, titanium dioxide, chalk or barium sulfate. Such coatings endure on the surface to which they are applied. However, this method of preparing matt, opaque surfaces is only suitable where no restrictions exist in terms of the purity or cleanliness of either the object to be coated/measured or the area or room in which the coating/measurement is to be performed as the released pigments lead to the contamination of the systems, devices (including the 3D scanner itself), areas and laboratories in which they are employed. Furthermore, recent studies have identified the released pigment particles such as $TiO_2$ as being potential health risks due to the susceptibility of the airborne particles to being inhaled into the lung tissue where they may reside and trigger severe health problems including lung cancer.

A further issue with the employment of such pigment-based coatings lies in the fact that, in order to retrieve the measured/scanned object in its original condition, the deposited antireflective layer must be removed again post-measurement. This poses a particular problem where the object to be measured is not of trivial value and/or its simple disposal post-measurement is not desired. In cases in which the coating has been applied to large, extended surfaces, ensuring a thorough removal of the coating layer is complicated and not always satisfactory, as residual coating material generally remains on the surface. In respect of sensitive and/or fragile objects such as, for example, structural components from the field of precision engineering and, in particular, such components which exhibit microcavities or an open-porous structure, application of such pigment-based coating layers inevitably leads to irreversible contamination or abrasions on the surface upon attempted removal of the coating. Typical procedures used for the removal of pigment-based coatings from the scanned object also involve the use of chemical cleaning agents whose use is often undesirable or even incompatible with the sprayed object. Accordingly, such cleaning processes are, even where successful, often extremely elaborate and time-consuming, thus rendering them technically or economically unattractive.

Objects which are subjected to 3D scanning are often component parts of other products including mechanical products. As such, the objects to be scanned are often protected from the environment by the presence of, for example, an oil or lubricant coating layer such to, for example, inhibit corrosion. The provision of a suitable antireflective coating layer on such an object is often impossible when using pigment-based agents as the pigments interact with the oil or lubricant on the surface of the object, thus forming an uneven surface or even clumps of pigment/oil. This has not only the disadvantage of not forming a coating which allows the object to be scanned but also of removing the protective oil/lubricant layer from the object, thus leaving it undesirably exposed to the environment. The cleaning of the object and reapplication of the protective oil/lubricant layer on the part of the party carrying out the 3D scanning operation such to minimise the time of exposure to the environment may also be undesirable for the manufacturer of said object, in particular where the object is of high value, fragility etc.

A further disadvantage often associated with the use of such pigment-based coatings is that relatively thick coating layers of high granularity can result. In turn, such properties can give rise to significant errors, distortions and irregularities in the results of measurements employing optical micromeasurement and scanning technology. In order to provide optimal measurement results of high precision, it is therefore preferable that thin antireflective coating layers of low granularity be applied to the surface to be measured.

In order to be able to conduct a 3D scan measurement, a series of adhesive dots or spots must generally first be applied to the surface of the object to be scanned. These dots or spots act as reference points for the scanner which aid it in establishing an accurate replication of the measured surface. Should an insufficient quantity of reference dots or spots have been employed, additional dots or spots must be applied to the surface to be scanned such to provide the scanner with sufficient reference points to be able to produce a high quality scan. In this regard, one further disadvantage of pigment-based sprays is that the surface is generally sprayed subsequent to the application of the reference dots or spots. If it is then ascertained that an insufficient number of reference dots has been applied in order to establish the desired scan quality, the application of additional dots or spots must be performed on top of the pigment coating. This, in turn, is problematic as it necessitates the handling of the sprayed object during which the pigments are easily removed from the surface upon touch. In fact, that such pigment coatings are so susceptible to undesired removal/smearing/smudging from/on the surface (marring) to be scanned upon even gentle contact poses a more general problem as the object to be scanned must often be turned or manoeuvred by hand in order to enable a full scan of the surface. As such, the provision of a product with the ability to form a coating on a surface to be scanned which is robust enough to withstand being touched and handled without negatively affecting the quality of the scannable surface (or at least not to the extent that a scan of sufficiently high quality can no longer be produced; also referred to as "mar resistance") would be of major benefit to the field. Furthermore, the provision of such a product which exhibits the versatility to allow the adhesive dots or spots required by the scanner to be applied subsequent to formation of the coating on the object to be scanned and to be removed and potentially subsequently reapplied without substantially detrimentally affecting either the coated surface or the adhesiveness of said dots or spots (thus allowing their re-use) would likewise constitute an advantage over known prior art solutions.

Means of overcoming primarily the above-outlined disadvantage of post-measurement coating removal associated with such a pigment-based-coating approach have been sought in the art, the ideal antireflective coating being free of pigments, thin, of low granularity, exhibiting uniform diffuse reflection of light in all directions and being capable of furnishing the scanned object post-measurement in its original, uncoated state without the need for the user to have to undertake actions such as cleaning or wiping of the surface to effect its removal.

To this end, coating materials which are volatile at room temperature or slightly above room temperature have been investigated. Due to their volatility, such agents evaporate or sublime from the coated surface within a relatively short period of time, thus leaving the surface residue-free without the need for the coating layer to be actively removed by means of cleaning, scrubbing, wiping, washing etc.

One such means known in the art for forming such a coating layer has its roots in the field of archaeology and restoration and involves the application of cyclododecane (often abbreviated to CCD or CDD) to the surface to be scanned by first providing a solution of CCD in a pressurised (and thus liquefied) propellant gas in a spray can and spraying the solution onto the surface to be measured (such a product is, for example, available under the trade name "Cyclodecan Spray" from Deffner & Johann GmbH, Germany). While this method addresses some of the aforementioned disadvantages associated with pigment-based sprays by giving rise to a sublimable coating layer, it suffers from the disadvantage that pronounced CCD crystal formation during application results in coarse, highly granular coating layers exhibiting irregular layer thickness and needle-like crystals. Such layers are not suitable for performing precise, high-resolution optical scans as unrectifiable measurement errors result. Such sprays also contain high concentrations of CCD, this being potentially disadvantageous from a cost perspective. Furthermore, such CCD sprays produce coating layers which easily smear or smudge (mar) upon handling and onto which the reference dots or spots required by the scanner in order to produce reliable, high-quality scans at best only very poorly adhere. Removal of the adhesive dots or spots from such a CCD-sprayed surface is generally seen to detrimentally affect the quality of the coating layer and the adhesive dots or spots are generally unable to be re-used. Anti-reflection products based exclusively on CCD also often have the disadvantage of bearing an odour or fragrance which may be considered unpleasant by the end user.

In light of the foregoing, it is an object underlying the present disclosure to provide a product for use in optical measurement technology applications and, in particular, 3D scanning which overcomes any one and preferably more than one of the above-mentioned disadvantages associated with prior art solutions to providing (anti-reflective) surfaces suitable for optical measurement. Of particular advantage would be the provision of a product capable of forming coating layers on objects which would otherwise not be capable of producing high-quality 3D scans, in particular the provision of a product capable of producing thin, homogenous coating layers on such objects, thus enabling the production of precise, high-quality and/or high resolution 3D scans of said objects. Said product should ideally be capable of returning the scanned objects free of coating layer post-measurement without the need of resorting to actively cleaning or removing said layer and it would be advantageous if the residence time of the coating layer on the object to be scanned could be tuned to fit the particular application at hand, preferably while simultaneously continuing to realize the other desired properties and effects outlined herein. In this regard, the ability to prolong the residence time without having to compromise on the optimal thinness of the coating layer and surface homogeneity would be a major benefit to the field. Furthermore, a product capable of producing coating layers which are resistant to marring/degradation upon handling and onto which reference dots and spots required by the scanning machine can be repeatedly applied and removed without adversely affecting surface quality or adhesiveness of the reference points would be of distinct advantage. A neutral- or pleasant-smelling product from the perspective of the end user would also be advantageous.

Such to ensure as broad an applicability as possible, it is desired that such a product may be employed directly (or with minimal manipulation and effort) by the end user in all imaginable/required situations without the need to employ any specially designed apparatus or equipment, thus allowing, inter alia, application of the coating layers in the field ("in situ") and not only in specially constructed or equipped laboratories or areas. In light of this object, it would be further advantageous were the coating layer produced by said product to withstand normal and even extreme weather conditions such as, for example, direct impact with water, strong winds, UV radiation and other conditions associated with working outdoors.

The provision of a product capable of forming coating layers with one or more of the above characteristics on objects to be scanned whose surfaces have been treated with a protective coating such as oil, said coating layer evaporating or subliming post-measurement to furnish the original object complete with intact protective coating layer would be of further great advantage for the 3D scanning of, inter alia, components which require constant protection from the environment via oil or lubricant coatings, particularly those for which, due for instance to their fragile or expensive nature, the reapplication of the protective oil or lubricant layer post-scan is undesirable.

The compositions of the present disclosure can, analogous to their use in furnishing surfaces for measurement by 3D scanning, also be employed to furnish surfaces for measurement using other optical measurement technologies such as photogrammetry. The optical measurement technique of photogrammetry uses photographic images captured with a camera (for instance, a smart phone camera) to obtain reliable data from physical objects which are the subject of said photographs (in particular relating to their surface structure and topography). Photogrammetry is commonly employed, for example, by surveyors, architects and engineers to create topographic maps, meshes, points of clouds or drawings based on physical objects. Photogrammetry can provide an alternative measurement technique to 3D scanning for furnishing a 3D map, picture or model of an object or surface. Photogrammetry may be preferred in certain contexts to 3D scanning as it is, generally, more accessible and affordable due to the measurement device required being a (simple) camera. Photogrammety may also be advantageous over and thus preferable to 3D scanning when measuring larger objects such as, for example, buildings (or parts of buildings) which would, often, require a 3D scanner to be adapted for those specific applications.

The issues concerning the light properties of the surfaces of the objects to be measured outlined above within the context of 3D scanning also exist in the context of optical measurement of surfaces by way of photogrammetry. Accordingly, a further object underlying the present disclosure is the provision of a product capable overcoming any one and preferably more than one of the above-mentioned disadvantages associated with prior art solutions to providing (anti-reflective) surfaces suitable for optical measurement (and discussed above within the context of 3D scanning), wherein the optical measurement is performed by means of photogrammetry.

SUMMARY OF THE INVENTION

In light of the foregoing, the present disclosure relates to the following items:
Item
1a. A composition comprising
  (i) adamantane; and
  (ii) a first solvent, wherein said first solvent is a hydrocarbon which has a boiling point of 25° C. or more at atmospheric pressure or a mixture of hydrocarbons which has a boiling point range, said boiling point range having a minimum boiling point of 25° C. or more at atmospheric pressure; and optionally
  (iii) cyclododecane; and/or optionally
  (iv) a second solvent which is different to said first solvent.
1b. A composition comprising
  (i) adamantane; and
  (ii) a first solvent, wherein said first solvent is a hydrocarbon which has a boiling point of 25° C. or more at atmospheric pressure or a mixture of hydrocarbons which has a boiling point range, said boiling point range having a minimum boiling point of 25° C. or more at atmospheric pressure;
  (iii) optionally comprising cyclododecane; and further comprising
  (iv) a second solvent which is different to said first solvent; and/or
  (v) a propellant.

2. The composition according any of the preceding items, wherein said first solvent has a boiling point or a boiling point range from 25° C. or more, 30° C. or more, 35° C. or more, or 40° C. or more to 50° C. or less, 60° C. or less, 65° C. or less, 70° C. or less, 75° C. or less, 80° C. or less, 90° C. or less, 100° C. or less, 110° C. or less, 120° C. or less, or 130° C. or less, at atmospheric pressure.

3. The composition according to any of the preceding items, wherein said first solvent has a boiling point or a boiling point range from 25° C. or more to 130° C. or less, at atmospheric pressure.

4. The composition according to any of the preceding items, wherein said first solvent has a boiling point or a boiling point range from 30° C. or more to 120° C. or less, at atmospheric pressure.

5. The composition according to any of the preceding items, wherein said first solvent has a boiling point or a boiling point range from 30° C. or more to 110° C. or less, at atmospheric pressure.

6. The composition according to any of the preceding items, wherein said first solvent has a boiling point or a boiling point range from 30° C. or more to 100° C. or less, at atmospheric pressure.

7. The composition according to any of the preceding items, wherein said first solvent has a boiling point or a boiling point range from 45° C. or more to 100° C. or less, at atmospheric pressure.

8. The composition according to any of the preceding items, wherein said first solvent has a boiling point or a boiling point range from 50° C. or more, in particular 60° C. or more, to 100° C. or less, in particular 95° C. or less, at atmospheric pressure.

9. The composition according to any of items 1 to 6, wherein said first solvent has a boiling point or a boiling point range from 30° C. or more to 90° C. or less, at atmospheric pressure.

10. The composition according to any of items 1 to 6 or 9, wherein said first solvent has a boiling point or a boiling point range from 30° C. or more to 80° C. or less, at atmospheric pressure.

11. The composition according to any of items 1 to 6, 9 or 10, wherein said first solvent has a boiling point or a boiling point range from 35° C. or more to 75° C. or less, at atmospheric pressure.

12. The composition according to any of items 1 to 6, 9, 10, or 11, wherein said first solvent has a boiling point or a boiling point range from 35° C. or more to 70° C. or less, at atmospheric pressure.

13. The composition according to any of items 1 to 6, 9, 10, 11, or 12, wherein said first solvent has a boiling point or a boiling point range from 35° C. or more to 65° C. or less, at atmospheric pressure.

14. The composition according to any of items 1 to 6, 9, 10, 11, 12, or 13, wherein said first solvent has a boiling point or a boiling point range from 40° C. or more to 65° C. or less, at atmospheric pressure.

15. The composition according to any of items 1 to 6, 9, 10, 11, 12, 13, or 14, wherein said first solvent has a boiling point or a boiling point range from 40° C. or more to 60° C. or less, at atmospheric pressure.

16. The composition according to any of items 1 to 6, 9, 10, 11, 12, 13, 14, or 15, wherein said first solvent has a boiling point or a boiling point range from 40° C. or more to 50° C. or less, at atmospheric pressure.

17. The composition according to any of the preceding items, wherein said first solvent is selected from the group consisting of one or more aliphatic straight chain, branched or cyclic $C_5$ to $C_{10}$ hydrocarbons, wherein said hydrocarbons may be saturated or unsaturated.

18. The composition according to any of the preceding items, wherein said first solvent is selected from the group consisting of one or more aliphatic straight chain, branched or cyclic $C_5$ to $C_8$ hydrocarbons, wherein said hydrocarbons may be saturated or unsaturated.

19. The composition according to any of the preceding items, wherein said first solvent is selected from the group consisting of $C_5$-hydrocarbons, $C_6$-hydrocarbons, $C_7$-hydrocarbons, $C_8$-hydrocarbons, and any combination of any thereof.

20. The composition according to any of the preceding items, wherein said first solvent is selected from the group consisting of pentane, cyclopentane, hexane, cyclohexane, heptane, cycloheptane, octane, petroleum ether, petroleum ether 30-40, petroleum ether 40-60, petroleum ether 40-65, petroleum ether 60-80, petroleum ether 80-100, and any combination of any thereof.

21. The composition according to any of items 1 to 19, wherein said first solvent is selected from the group consisting of pentane, cyclopentane, hexane, cyclohexane, heptane, cycloheptane, octane, petroleum ether, petroleum ether 30-40, petroleum ether 40-60, petroleum ether 40-65, petroleum ether 60-80, petroleum ether 60-95, petroleum ether 80-100, and any combination of any thereof.

22. The composition according to any of the preceding items, wherein said first solvent is petroleum ether 40-65.

23. The composition according to any of items 1 to 19 or 21, wherein said first solvent is petroleum ether 60-95.

24. The composition according to any of items 1 to 21, wherein said first solvent is cyclopentane.

25. The composition according to any of items 1 to 21, wherein said first solvent is a mixture of petroleum ether 60-95 and cyclopentane.

26. The composition according to any of the preceding items, wherein the total combined quantity of (i) adamantane and, where present, (iii) cyclododecane is from 0.5 wt. % or more, 1.0 wt. % or more, 1.5 wt. % or more, 2.5 wt. % or more, 3 wt. % or more, 5 wt. % or more, or 6 wt. % or more to 10 wt. % or less, 11 wt. % or less, 12 wt. % or less, 15 wt. % or less, 20 wt. % or less, 30 wt. % or less, 50 wt. % or less, based on the total weight of components (i) to (iv).

27. The composition according to any of the preceding items, wherein the total combined quantity of (i) adamantane and, where present, (iii) cyclododecane is from 0.5 wt. % or more to 50 wt. % or less, based on the total weight of components (i) to (iv).

28. The composition according to any of the preceding items, wherein the total combined quantity of (i) adamantane and, where present, (iii) cyclododecane is from 1.0 wt. % or more to 30 wt. % or less, based on the total weight of components (i) to (iv).

29. The composition according to any of the preceding items, wherein the total combined quantity of (i) adamantane and, where present, (iii) cyclododecane is from 1.5 wt. % or more to 20 wt. % or less, based on the total weight of components (i) to (iv).

30. The composition according to any of the preceding items, wherein the total combined quantity of (i) adamantane and, where present, (iii) cyclododecane is from 2.5 wt. % or more to 15 wt. % or less, based on the total weight of components (i) to (iv).

31. The composition according to any of the preceding items, wherein the total combined quantity of (i) adamantane and, where present, (iii) cyclododecane is from 3 wt. % or more to 12 wt. % or less, based on the total weight of components (i) to (iv).

32. The composition according to any of the preceding items, wherein the total combined quantity of (i) adamantane and, where present, (iii) cyclododecane is from 5 wt. % or more to 11 wt. % or less, based on the total weight of components (i) to (iv).

33. The composition according to any of the preceding items, wherein the total combined quantity of (i) adamantane and, where present, (iii) cyclododecane is from 6 wt. % or more to 10 wt. % or less, based on the total weight of components (i) to (iv).

34. The composition according to any of the preceding items, wherein the total combined quantity of (i) adamantane and, where present, (iii) cyclododecane is from 10.0 wt. % or more, 12 wt. % or more, 13 wt. % or more, 15 wt. % or more, 20 wt. % or more, 25 wt. % or more, 30 wt. % or more, 35 wt. % or more, 40 wt. % or more, 45 wt. % or more, 50 wt. % or more, or 55 wt. % or more to 90 wt. % or less, 85 wt. % or less, 80 wt. % or less, 75 wt. % or less, 70 wt. % or less, 65 wt. % or less, or 60 wt. % or less, based on the total weight of components (i) to (iv).

35. The composition according to any of items 1 to 30 or 34, wherein the total combined quantity of (i) adamantane and, where present, (iii) cyclododecane is from 10 wt. % or more to 15 wt. % or less, based on the total weight of components (i) to (iv).

36. The composition according to any of items 1 to 30 or 34 to 35, wherein the total combined quantity of (i) adamantane and, where present, (iii) cyclododecane is from 12 wt. % or more to 15 wt. % or less, based on the total weight of components (i) to (iv).

37. The composition according to any of items 1 to 30 or 34 to 36, wherein the total combined quantity of (i) adamantane and, where present, (iii) cyclododecane is from 13 wt. % or more to 15 wt. % or less, based on the total weight of components (i) to (iv).

38. The composition according to any of items 1 to 25 or 34, wherein the total combined quantity of (i) adamantane and, where present, (iii) cyclododecane is from 10 wt. % or more to 55 wt. % or less, based on the total weight of components (i) to (iv).

39. The composition according to any of items 1 to 27, 34 or 38, wherein the total combined quantity of (i) adamantane and, where present, (iii) cyclododecane is from 10 wt. % or more to 50 wt. % or less, based on the total weight of components (i) to (iv).

40. The composition according to any of items 1 to 25 or 34, wherein the total combined quantity of (i) adamantane and, where present, (iii) cyclododecane is from 20 wt. % or more to 90 wt. % or less, based on the total weight of components (i) to (iv).

41. The composition according to any of items 1 to 25, 34 or 40, wherein the total combined quantity of (i) adamantane and, where present, (iii) cyclododecane is from 25 wt. % or more to 85 wt. % or less, based on the total weight of components (i) to (iv).

42. The composition according to any of items 1 to 25, 34, 40 or 41, wherein the total combined quantity of (i) adamantane and, where present, (iii) cyclododecane is from 30 wt. % or more to 80 wt. % or less, based on the total weight of components (i) to (iv).

43. The composition according to any of items 1 to 25, 34, or 40 to 42, wherein the total combined quantity of (i) adamantane and, where present, (iii) cyclododecane is from 30 wt. % or more to 75 wt. % or less, based on the total weight of components (i) to (iv).

44. The composition according to any of items 1 to 25, 34, or 40 to 43, wherein the total combined quantity of (i) adamantane and, where present, (iii) cyclododecane is from 30 wt. % or more to 70 wt. % or less, based on the total weight of components (i) to (iv).
45. The composition according to any of items 1 to 25, 34, or 40 to 44, wherein the total combined quantity of (i) adamantane and, where present, (iii) cyclododecane is from 30 wt. % or more to 65 wt. % or less, based on the total weight of components (i) to (iv).
46. The composition according to any of items 1 to 25, 34, or 40 to 45, wherein the total combined quantity of (i) adamantane and, where present, (iii) cyclododecane is from 35 wt. % or more to 60 wt. % or less, based on the total weight of components (i) to (iv).
47. The composition according to any of items 1 to 25, 34, 38 or 40 to 46, wherein the total combined quantity of (i) adamantane and, where present, (iii) cyclododecane is from 35 wt. % or more to 55 wt. % or less, based on the total weight of components (i) to (iv).
48. The composition according to any of items 1 to 25, 34, 38 or 40 to 47, wherein the total combined quantity of (i) adamantane and, where present, (iii) cyclododecane is from 40 wt. % or more to 55 wt. % or less, based on the total weight of components (i) to (iv).
49. The composition according to any of items 1 to 27, 34, or 38 to 48, wherein the total combined quantity of (i) adamantane and, where present, (iii) cyclododecane is from 40 wt. % or more to 50 wt. % or less, based on the total weight of components (i) to (iv).
50. The composition according to any of items 1 to 27, 34, or 38 to 49, wherein the total combined quantity of (i) adamantane and, where present, (iii) cyclododecane is from 45 wt. % or more to 50 wt. % or less, based on the total weight of components (i) to (iv).
50a. The composition according to any of items 1 to 27, 34, or 38 to 45, wherein the total combined quantity of (i) adamantane and, where present, (iii) cyclododecane is from 30 wt. % or more to 50 wt. % or less, based on the total weight of components (i) to (iv).
50b. The composition according to any of items 1 to 27, 34, 38 to 45, or 50a, wherein the total combined quantity of (i) adamantane and, where present, (iii) cyclododecane is from 30 wt. % or more to 40 wt. % or less, based on the total weight of components (i) to (iv).
50c. The composition according any of items 1 to 27, 34, 38 to 47, or 50a, wherein the total combined quantity of (i) adamantane and, where present, (iii) cyclododecane is from 35 wt. % or more to 50 wt. % or less, based on the total weight of components (i) to (iv).
50d. The composition according to any of items 1 to 27, 34, 38 to 47, 50a, or 50c, wherein the total combined quantity of (i) adamantane and, where present, (iii) cyclododecane is from 35 wt. % or more to 45 wt. % or less, based on the total weight of components (i) to (iv).
50e. The composition according to any of items 1 to 27, 34, 38 to 47, 50a, 50c, or 50d, wherein the total combined quantity of (i) adamantane and, where present, (iii) cyclododecane is from 35 wt. % or more to 40 wt. % or less, based on the total weight of components (i) to (iv).
51. The composition according to any of the preceding items, wherein said composition does not comprise any (iii) cyclododecane.
52. The composition according to any of the preceding items, wherein said composition does not comprise a (iv) second solvent.
53. The composition according to any of items 1 to 50 or 52, wherein said composition comprises (iii) cyclododecane.
54. The composition according to any of items 1 to 50, 52 or 53, wherein the total combined quantity of (i) adamantane and, where present, (iii) cyclododecane is from 9.0 wt. % or more to 11.0 wt. % or less, preferably from 9.5 wt. % or more to 10.5 wt. % or less, based on the total weight of components (i) to (iv).
55. The composition according to any of the preceding items, wherein the ratio of adamantane to cyclododecane on a weight to weight basis is from 100:0, 95:5, 90:10, 80:20, 75:25, 2.7:1, 60:40, or 51:49 to 49:51, 40:60, 1:2.7, 25:75, 20:80, 10:90, 5:95, or 1:99.
56. The composition according to any of the preceding items, wherein the ratio of adamantane to cyclododecane on a weight to weight basis is from 100:0 to 1:99.
57. The composition according to any of the preceding items, wherein the ratio of adamantane to cyclododecane on a weight to weight basis is from 100:0 to 5:95.
58. The composition according to any of the preceding items, wherein the ratio of adamantane to cyclododecane on a weight to weight basis is from 100:0 to 10:90.
59. The composition according to any of the preceding items, wherein the ratio of adamantane to cyclododecane on a weight to weight basis is from 100:0 to 20:80.
60. The composition according to any of the preceding items, wherein the ratio of adamantane to cyclododecane on a weight to weight basis is from 100:0 to 25:75.
61. The composition according to any of the preceding items, wherein the ratio of adamantane to cyclododecane on a weight to weight basis is from 100:0 to 1:2.7.
62. The composition according to any of the preceding items, wherein the ratio of adamantane to cyclododecane on a weight to weight basis is from 100:0 to 40:60.
63. The composition according to any of the preceding items, wherein the ratio of adamantane to cyclododecane on a weight to weight basis is from 100:0 to 49:51.
64. The composition according to any of the preceding items, wherein the ratio of adamantane to cyclododecane on a weight to weight basis is from 95:5 to 5:95.
65. The composition according to any of the preceding items, wherein the ratio of adamantane to cyclododecane on a weight to weight basis is from 90:10 to 10:90.
66. The composition according to any of the preceding items, wherein the ratio of adamantane to cyclododecane on a weight to weight basis is from 80:20 to 20:80.
67. The composition according to any of the preceding items, wherein the ratio of adamantane to cyclododecane on a weight to weight basis is from 75:25 to 25:75.
68. The composition according to any of the preceding items, wherein the ratio of adamantane to cyclododecane on a weight to weight basis is from 2.7:1 to 1:2.7.
69. The composition according to any of the preceding items, wherein the ratio of adamantane to cyclododecane on a weight to weight basis is from 60:40 to 40:60.
70. The composition according to any of the preceding items, wherein the ratio of adamantane to cyclododecane is on a weight to weight basis from 51:49 to 49:51.
71. The composition according to any of items 1 to 69, wherein the ratio of adamantane to cyclododecane is on a weight to weight basis from 1.5:1 to 1:1.
72. The composition according to any of items 1 to 69 or 71, wherein the ratio of adamantane to cyclododecane is on a weight to weight basis from 1.5:1 to 1.25:1.

73. The composition according to any of items 1 to 69, 71 or 72, wherein the ratio of adamantane to cyclododecane is on a weight to weight basis from 1.4:1 to 1.3:1.

74. The composition according to any of the preceding items, wherein said composition comprises (iv) a second solvent which is different to said first solvent, preferably wherein said second solvent is more polar than said first solvent.

75. The composition according to any of the preceding items, wherein said second solvent has a boiling point or boiling point range from 40° C. or more, 50° C. or more, 60° C. or more, 64.7° C. or more, 70° C. or more, 75° C. or more, 80° C. or more, or 82° C. or more to 90° C. or less, 100° C. or less, 110° C. or less, 120° C. or less, 130° C. or less, 140° C. or less, 150° C. or less, or 160° C. or less, at atmospheric pressure.

76. The composition according to any of the preceding items, wherein said second solvent has a boiling point or boiling point range from 40° C. or more to 160° C. or less, at atmospheric pressure.

77. The composition according to any of the preceding items, wherein said second solvent has a boiling point or boiling point range from 50° C. or more to 150° C. or less, at atmospheric pressure.

78. The composition according to any of the preceding items, wherein said second solvent has a boiling point or boiling point range from 60° C. or more to 140° C. or less, at atmospheric pressure.

79. The composition according to any of the preceding items, wherein said second solvent has a boiling point or boiling point range from 64.7° C. or more to 130° C. or less, at atmospheric pressure.

80. The composition according to any of the preceding items, wherein said second solvent has a boiling point or boiling point range from 70° C. or more to 120° C. or less, at atmospheric pressure.

81. The composition according to any of the preceding items, wherein said second solvent has a boiling point or boiling point range from 75° C. or more to 110° C. or less, at atmospheric pressure.

82. The composition according to any of the preceding items, wherein said second solvent has a boiling point or boiling point range from 80° C. or more to 100° C. or less, at atmospheric pressure.

83. The composition according to any of the preceding items, wherein said second solvent has a boiling point or boiling point range from 82° C. or more to 90° C. or less, at atmospheric pressure.

84. The composition according to any of items 1 to 79, wherein said second solvent has a boiling point or boiling point range from 64.7° C. or more to 100° C. or less, at atmospheric pressure.

85. The composition according to any of items 1 to 80 or 84, wherein said second solvent has a boiling point or boiling point range from 70° C. or more to 90° C. or less, at atmospheric pressure.

86. The composition according to any of items 1 to 81, 84 or 85, wherein said second solvent has a boiling point or boiling point range from 75° C. or more to 90° C. or less, at atmospheric pressure.

87. The composition according to any of items 1 to 81, 84, 85 or 86, wherein said second solvent has a boiling point or boiling point range from 75° C. or more to 85° C. or less, at atmospheric pressure.

88. The composition according to any of the preceding items, wherein said second solvent is one or more alcohols, preferably wherein said second solvent is one or more alcohols selected from the group consisting of $C_1$ to $C_8$ alcohols, in particular $C_1$ to $C_8$ monoalcohols.

89. The composition according to any of the preceding items, wherein said second solvent is one or more alcohols selected from the group consisting of $C_1$ to $C_8$ alkanols and $C_3$ to $C_8$ cycloalkanols, preferably wherein said second solvent is one or more alcohols selected from the group consisting of methanol, ethanol, n-propanol, iso-propanol, cyclopropanol, n-butanol, sec-butanol, iso-butanol, tert-butanol, cyclobutanol, n-pentanol, 3-methylbutan-1-ol, 2-methylbutan-1-ol, 2,2-dimethylpropan-1-ol, pentan-3-ol, pentan-2-ol, 3-methylbutan-2-ol, 2-methylbutan-2-ol, cyclopentanol, hexan-1-ol, hexan-2-ol, hexan-3-ol, 2-methylpentan-1-ol, 3-methylpentan-1-ol, 4-methylpentan-1-ol, 2-methylpentan-2-ol, 3-methylpentan-2-ol, 4-methylpentan-2-ol, 2-methylpentan-3-ol, 3-methylpentan-3-ol, 2,2-dimethylbutan-1-ol, 2,3-dimethylbutan-1-ol, 3,3-dimethylbutan-1-ol, 2,3-dimethylbutan-2-ol, 3,3-dimethylbutan-2-ol, 2-ethylbutan-1-ol, cyclohexanol, 2-heptanol, 3-heptanol, and 4-heptanol.

90. The composition according to any of the preceding items, wherein said second solvent is isopropanol.

91. The composition according to any of items 1 to 89, wherein said second solvent is ethanol.

92. The composition according to any of items 1 to 89, wherein said second solvent is a mixture of isopropanol and ethanol.

93. The composition according to any of the preceding items, wherein the ratio of said (ii) first solvent to said (iv) second solvent on a weight to weight basis is from 99:1, 95:5, 90:10, 80:20, 70:30, 2:1, 60:40, or 55:45 to 45:55, 40:60, 1:2, 30:70, 20:80, 10:90, 5:95, or 1:99.

94. The composition according to any of the preceding items, wherein the ratio of said (ii) first solvent to said (iv) second solvent on a weight to weight basis is from 99:1 to 1:99.

95. The composition according to any of the preceding items, wherein the ratio of said (ii) first solvent to said (iv) second solvent on a weight to weight basis is from 95:5 to 5:95.

96. The composition according to any of the preceding items, wherein the ratio of said (ii) first solvent to said (iv) second solvent on a weight to weight basis is from 90:10 to 10:90.

97. The composition according to any of the preceding items, wherein the ratio of said (ii) first solvent to said (iv) second solvent on a weight to weight basis is from 80:20 to 20:80.

98. The composition according to any of the preceding items, wherein the ratio of said (ii) first solvent to said (iv) second solvent on a weight to weight basis is from 3:1 to 1:3.

99. The composition according to any of the preceding items, wherein the ratio of said (ii) first solvent to said (iv) second solvent on a weight to weight basis is from 70:30 to 30:70.

100. The composition according to any of the preceding items, wherein the ratio of said (ii) first solvent to said (iv) second solvent on a weight to weight basis is from 2:1 to 1:2.

101. The composition according to any of the preceding items, wherein the ratio of said (ii) first solvent to said (iv) second solvent on a weight to weight basis is from 60:40 to 40:60.

102. The composition according to any of the preceding items, wherein the ratio of said (ii) first solvent to said (iv) second solvent on a weight to weight basis is from 45:55 to 55:45.

102a. The composition according to any of the preceding items, wherein said composition contains a greater quantity of said (ii) first solvent than said (iv) second solvent on a weight to weight basis.
103. The composition according to any of the preceding items, wherein the ratio of said (ii) first solvent to said (iv) second solvent on a weight to weight basis is from 6:1 to 1:1.
104. The composition according to any of the preceding items, wherein the ratio of said (ii) first solvent to said (iv) second solvent on a weight to weight basis is from 5:1 to 2:1.
105. The composition according to any of the preceding items, wherein the ratio of said (ii) first solvent to said (iv) second solvent on a weight to weight basis is from 5:1 to 3:1.
106. The composition according to any of the preceding items, wherein the ratio of said (ii) first solvent to said (iv) second solvent on a weight to weight basis is 4:1.
106a. The composition according to any of the preceding items, wherein the ratio of said (ii) first solvent to said (iv) second solvent on a weight to weight basis is from 3:1 to 1:1.
107. The composition according to any of the preceding items, wherein the ratio of said (ii) first solvent to said (iv) second solvent on a weight to weight basis is from 3:1 to 2:1.
108. The composition according to any of the preceding items, wherein the ratio of said (ii) first solvent to said (iv) second solvent on a weight to weight basis is 1:1.
109. The composition according to any of the preceding items, wherein the ratio of said (ii) first solvent to said (iv) second solvent on a weight to weight basis is from 40:60 to 5:95.
110. The composition according to any of the preceding items, wherein the ratio of said (ii) first solvent to said (iv) second solvent on a weight to weight basis is from 40:60 to 10:90.
111. The composition according to any of the preceding items, wherein the ratio of said (ii) first solvent to said (iv) second solvent on a weight to weight basis is from 40:60 to 20:80.
112. The composition according to any of the preceding items, wherein the ratio of said (ii) first solvent to said (iv) second solvent on a weight to weight basis is from 40:60 to 20:80.
113. The composition according to any of the preceding items, wherein the ratio of said (ii) first solvent to said (iv) second solvent on a weight to weight basis is from 40:60 to 30:70.
114. The composition according to any of the preceding items, wherein the ratio of said (iii) cyclododecane to said (iv) second solvent on a weight to weight basis is from 3:1 to 1:3.
115. The composition according to any of the preceding items, wherein the ratio of said (iii) cyclododecane to said (iv) second solvent on a weight to weight basis is from 2:1 to 1:2.
116. The composition according to any of the preceding items, wherein the ratio of said (iii) cyclododecane to said (iv) second solvent on a weight to weight basis is from 1:1 to 1:5.
117. The composition according to any of the preceding items, wherein the ratio of said (iii) cyclododecane to said (iv) second solvent on a weight to weight basis is from 1:1 to 1:4.
118. The composition according to any of the preceding items, wherein the ratio of said (iii) cyclododecane to said (iv) second solvent on a weight to weight basis is from 1:1 to 1:2.
119. The composition according to any of the preceding items, wherein the ratio of said (iii) cyclododecane to said (iv) second solvent on a weight to weight basis is from 1:1 to 1:1.5.
120. The composition according to any of the preceding items, wherein the ratio of said (iii) cyclododecane to said (iv) second solvent on a weight to weight basis is from 1:1.1 to 1:1.4.
121. The composition according to any of the preceding items, wherein the ratio of said (iii) cyclododecane to said (iv) second solvent on a weight to weight basis is from 1:1.2 to 1:1.4.
122. The composition according to any of the preceding items, wherein the ratio of said (iii) cyclododecane to said (iv) second solvent on a weight to weight basis is from 1:1.3 to 1:1.4.
123. The composition according to any of the preceding items, wherein the ratio of said (iii) cyclododecane to said (iv) second solvent on a weight to weight basis is 3:4.
124. The composition according to any of the preceding items, wherein the ratio of said (iii) cyclododecane to said (iv) second solvent on a weight to weight basis is from 1:15 to 1:3.5.
125. The composition according to any of the preceding items, wherein the ratio of said (iii) cyclododecane to said (iv) second solvent on a weight to weight basis is 1.2.5.
126. The composition of any of the preceding items, wherein the composition further comprises one or more additives, in particular one or more additives selected from camphor, menthol and combinations thereof, preferably in a quantity from 0.1 wt. % or more to 5 wt. % or less, more preferably from 0.25 wt. % or more to 2.5 wt. % or less, most preferably from 0.5 wt. % or more to 1.5 wt. % or less or 1.0 wt. % or less, based on the total combined weight of said additives and each of components (i) to (iv).
127. The composition of any of the preceding items, wherein the composition further comprises one or more additives, in particular one or more additives selected from camphor, menthol, limonene (in particular D-limonene), and combinations thereof, preferably in a quantity from 0.1 wt. % or more to 5 wt. % or less, more preferably from 0.25 wt. % or more to 2.5 wt. % or less, most preferably from 0.5 wt. % or more to 1.5 wt. % or less or 1.0 wt. % or less, based on the total combined weight of said additives and each of components (i) to (iv).
128. The composition according to any of the preceding items, wherein the (i) adamantane and, where present, (iii) cyclododecane and any further additives present are in solution in the (ii) first solvent and, where present, (iv) second solvent.
129. The composition according to any of the preceding items, wherein said composition further comprises a propellant.
130. The composition according to item 129, wherein said propellant is selected from butane, propane, isobutane and any combination of any thereof.
131. The composition of any of items 129 or 130, wherein said propellant is present in an amount from 15 wt. % or more to 90 wt. % or less, preferably from 20 wt. % or more to 80 wt. % or less, more preferably from 25 wt. % or more to 75 wt. % or less, based on the total weight of the composition.
132. The composition of any of items 129 to 131, wherein said propellant is present in an amount from 30 wt. % or more to 70 wt. % or less, preferably from 35 wt. % or more to 60 wt. % or less, more preferably from 40 wt. % or more to 50 wt. % or less, based on the total weight of the composition.

133. The composition of any of the preceding items, wherein the composition is free or essentially free of $C_{3-13}$dialkyl ketones.

134. The composition of any of the preceding items, wherein the composition is free of $C_{3-13}$dialkyl ketones.

135. The composition of any of the preceding items, wherein the composition is free or essentially free of acetone.

136. The composition of any of the preceding items, wherein the composition is free of acetone.

137. The composition of any of the preceding items, wherein the composition is free or essentially free of methylethylketone.

138. The composition of any of the preceding items, wherein the composition is free of methylethylketone.

139. The composition of any of the preceding items, wherein the composition is free or essentially free of isopropanol.

140. The composition of any of the preceding items, wherein the composition is free of isopropanol.

141. The composition of any of the preceding items, wherein the quantity of (i) adamantane is less than 30 wt. %, based on the total weight of components (i) to (iv).

142. The composition of any of the preceding items, wherein the quantity of (i) adamantane is less than 20 wt. %, based on the total weight of components (i) to (iv).

143. The composition of any of the preceding items, wherein the quantity of (i) adamantane is less than 15 wt. %, based on the total weight of components (i) to (iv).

144. The composition of any of the preceding items, wherein the composition comprises a (iv) second solvent which is different to said first solvent and the quantity of said (iv) second solvent which is different to said first solvent is 50 wt. % or less based on the total weight of components (i) to (iv).

145. The composition of any of the preceding items, wherein the composition comprises a (iv) second solvent which is different to said first solvent and the quantity of said (iv) second solvent which is different to said first solvent is 40 wt. % or less based on the total weight of components (i) to (iv).

146. The composition of any of the preceding items, wherein the composition comprises a (iv) second solvent which is different to said first solvent and the quantity of said (iv) second solvent which is different to said first solvent is 30 wt. % or less based on the total weight of components (i) to (iv).

147. The composition of any of the preceding items, wherein the composition comprises less than 30 wt. % of an alcohol, in particular of ethanol and/or isopropanol, based on the total weight of components (i) to (iv).

148. The composition of any of the preceding items, wherein the composition comprises less than 85 wt. %, preferably less than 50 wt. %, more preferably less than 25 wt. %, still more preferably less than 10 wt. % cyclohexane, based on the total weight of components (i) to (iv).

149. The composition of any of the preceding items, wherein the composition is free or essentially free of cyclohexane.

150. The composition of any of the preceding items, wherein the composition is free or essentially free of isopentane.

151. The composition of any of the preceding items, wherein the composition consists essentially of the components explicitly recited therein.

152. The composition of any of the preceding items, wherein the composition consists of the components explicitly recited therein.

153. Use of the composition according to any of the preceding items in 3D scanning applications.

154. Use of the composition according to any of items 1 to 152 to prepare the surface of an object for a 3D scan measurement.

155. Use of the composition according to any of items 1 to 152 to increase the quality and/or resolution of a 3D scan of an object.

156. Use of the composition according to any of items 1 to 152 to increase the diffuseness of light reflection of a surface to which said composition is applied.

157. Use of the composition according to any of items 1 to 152 to improve the 3D scannability of a surface.

158. A method of improving the 3D scannability of a surface, said method comprising the step of applying a composition according to any of items 1 to 152 to the surface to be scanned.

159. A method of preparing the surface of an object for a 3D scan measurement, said method comprising the step of applying a composition according to any of items 1 to 152 to the surface to be scanned.

160. A method of producing a 3D scan of an object, said method comprising the steps of 1) applying a composition according to any of items 1 to 152 to the surface of the object to be scanned, and 2) performing a 3D scan measurement.

161. Use of the composition according to any of items 1 to 152 in photogrammetry.

162. Use of the composition according to any of items 1 to 152 to prepare the surface of an object for optical measurement by photogrammetry.

163. Use of the composition according to any of items 1 to 152 to increase the quality and/or resolution of a scan of an object, wherein said scan is conducted using photogrammetry.

164. Use of the composition according to any of items 1 to 152 to improve the scannability by photogrammetry of a surface.

165. A method of improving the scannability by photogrammetry of a surface, said method comprising the step of applying a composition according to any of items 1 to 152 to the surface to be scanned by photogrammetry.

166. A method of preparing the surface of an object for a photogrammetry scan measurement, said method comprising the step of applying a composition according to any of items 1 to 152 to the surface to be scanned.

167. A method of producing a photogrammetry scan of an object, said method comprising the steps of 1) applying a composition according to any of items 1 to 152 to the surface of the object to be scanned, and 2) performing a photogrammetry scan measurement.

168. Use of the composition according to any of items 1 to 152 to reduce the intensity of light reflection of a surface to which said composition is applied.

169. Use of the composition according to any of items 1 to 152 as a matting agent.

170. Use of the composition according to any of items 1 to 152 to increase the opaqueness of a surface to which said composition is applied.

171. Use of the composition according to any of items 1 to 152 to produce a protective coating on a surface to which said composition is applied, in particular wherein said protective coating is a temporary protective coating, preferably wherein said temporary protective coating sublimes over time.

DETAILED DESCRIPTION OF THE INVENTION

Figure 1:
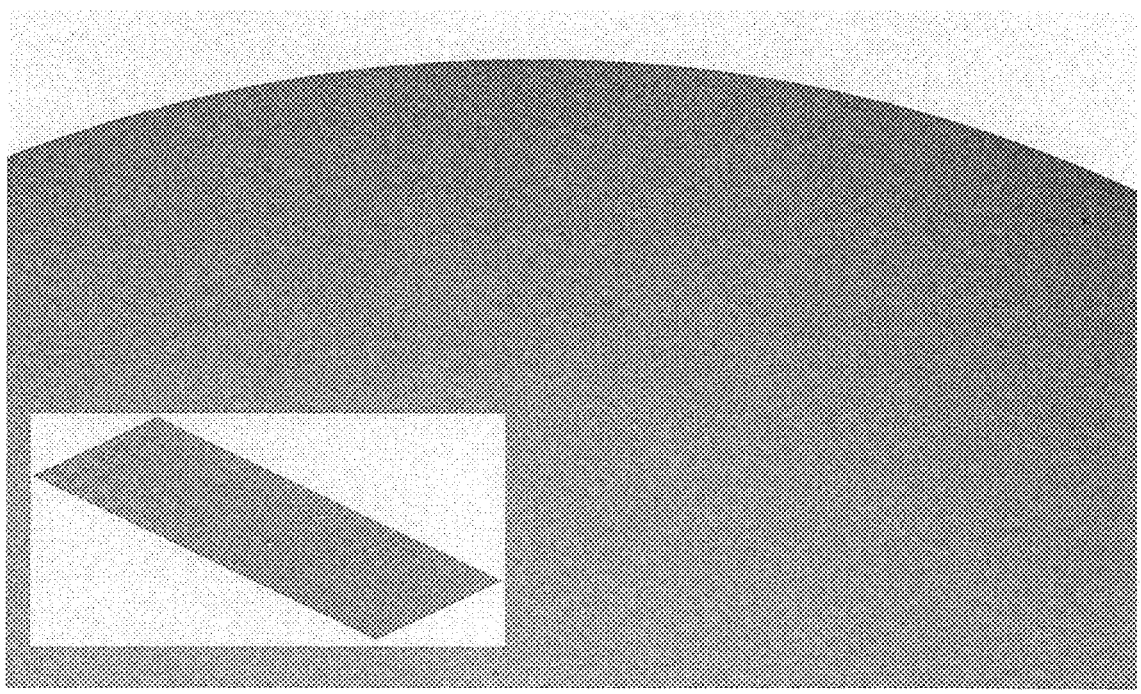
FIG. 1 represents a visual representation of the coating surface of Example 1.
Figure 2:
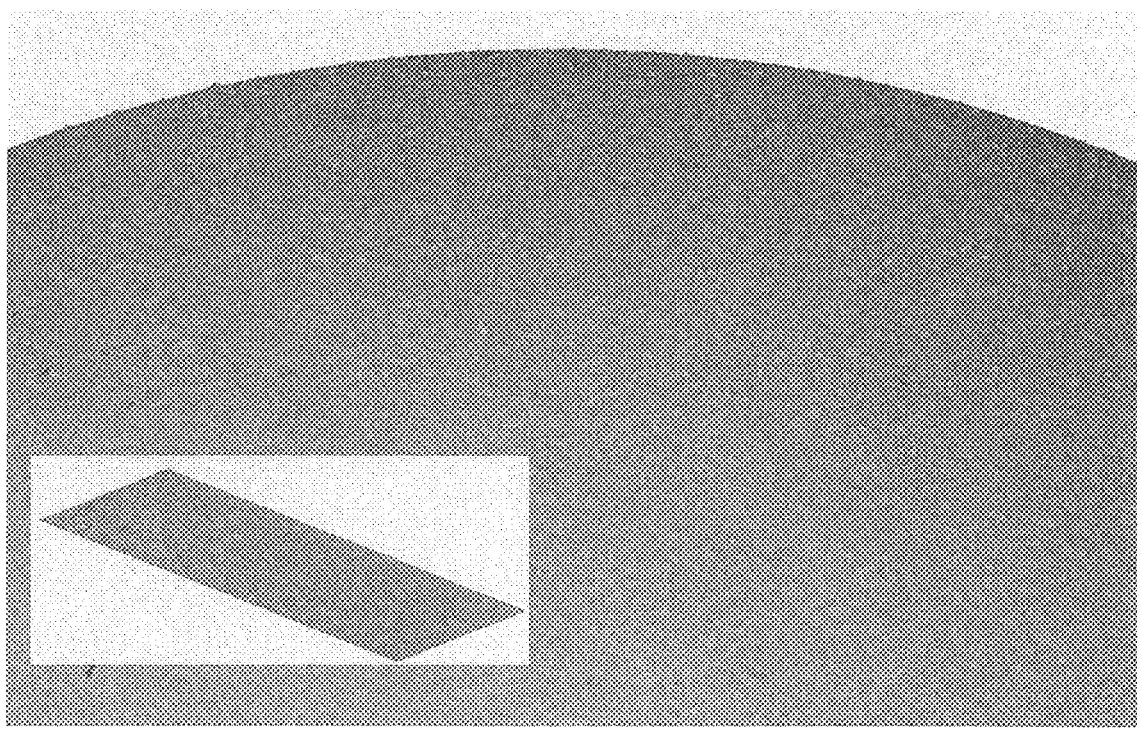
FIG. 2 represents a visual representation of the coating surface of Example 2.
Figure 3:
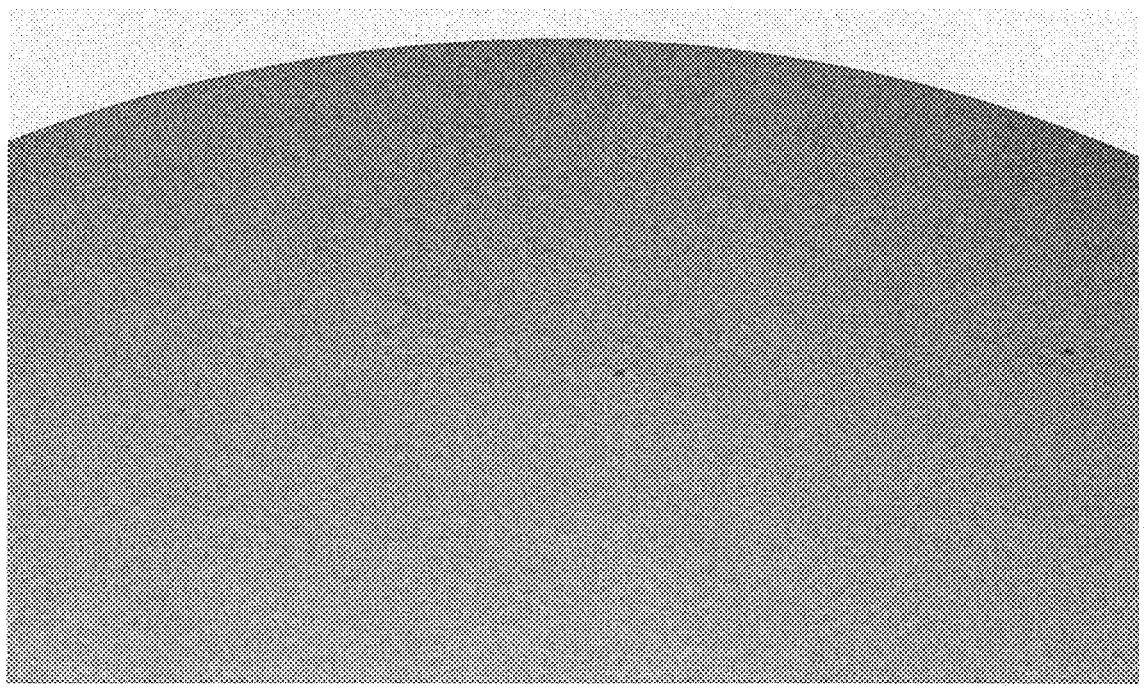
FIG. 3 represents a visual representation of the coating surface of Example 3.

Unless specified otherwise herein, atmospheric pressure is to be understood to be 101.325 kPa. Unless specified otherwise herein, room or ambient temperature is to be understood to be 21±1° C. Unless otherwise stated, all measurements and processes disclosed herein are to be understood to have been conducted at atmospheric pressure and room temperature. Unless otherwise stated, all boiling point values referred to herein are to be understood to be boiling point values as measured at atmospheric pressure. Unless stated otherwise, all weight percentage values (wt. %) specified herein are to be understood to refer to weight percentages relative to the total weight of the composition.

The compositions of the present disclosure serve to realize one or more of the above-outlined objects by overcoming one or more disadvantages associated with the known prior art solutions for preparing surfaces of objects for 3D scan measurements, in particular providing objects with antireflective coatings which enable improved 3D scanning measurements of said objects to be conducted.

In this regard, the present disclosure relates to a composition comprising
(i) adamantane; and
(ii) a first solvent, wherein said first solvent is a hydrocarbon which has a boiling point of 25° C. or more at atmospheric pressure or a mixture of hydrocarbons which has a boiling point range, said boiling point range having a minimum boiling point of 25° C. or more at atmospheric pressure; and optionally
(iii) cyclododecane; and/or optionally
(iv) a second solvent which is different to said first solvent.

In this context, the present disclosure also relates to a composition comprising
(i) adamantane; and
(ii) a first solvent, wherein said first solvent is a hydrocarbon which has a boiling point of 25° C. or more at atmospheric pressure or a mixture of hydrocarbons which has a boiling point range, said boiling point range having a minimum boiling point of 25° C. or more at atmospheric pressure;
(iii) optionally comprising cyclododecane;
and further comprising
(iv) a second solvent which is different to said first solvent; and/or
(v) a propellant.

It has been discovered by the present inventors that one or more of the above-outlined problems can be overcome using a solution of adamantane in a first solvent or mixture of a first and second solvents as defined in the claims. As demonstrated through the experimental data in the present application, a direct comparison of the compositions of the present disclosure with prior art alternatives which also employ sublimable coatings in 3D scanning applications shows that the compositions of the present disclosure give rise to coatings of vastly improved thinness, homogeneity and surface quality, thus allowing for the first time the generation of precise, high quality, high resolution 3D scans of surfaces and objects to which such a sublimable composition has been applied. Furthermore, the compositions of the present disclosure employing adamantane in at least a first solvent are seen to exhibit a series of further advantages over prior art compositions employing CCD dissolved exclusively in propellant gas(es), i.e. the known prior art solution for providing sublimable coatings in the field of 3D scanning, in that a surface displaying, among other things, excellent mar resistance, dot adhesion, tolerance of dot removal and reapplication, and residence time properties is obtained. Moreover, use of adamantane in place of CCD carries the additional advantage of not subjecting the user to a composition or coated object with an unpleasant or pungent smell. Despite their thinness, the coatings generated by the compositions of the present disclosure are further seen to exhibit excellent weatherability properties through, among other things, high levels of durability and robustness against direct contact with running water and are capable of forming coatings displaying all of the aforementioned advantages on oiled/lubricated surfaces which, following sublimation of the coating, remain oiled/lubricated and thus protected from the environment. Compared with the compositions of the prior art, a reduced level (in fact, generally zero) of reapplication of oil/lubricant is required. That the compositions disclosed herein exhibit any one of these advantages serves to provide a valuable contribution to the art. That, as demonstrated herein, an excellent balance of such a wide range of properties is realized makes the contribution of the compositions of the present disclosure all the more valuable.

In the present disclosure, adamantane refers to the compound known in the art as adamantane ($C_{10}H_{16}$) and not to any other adamantane-containing materials such as, for example, polyadamantanes (also known as diamantoids) which comprise two or more adamantane units in a single molecule, or substituted adamantane. The compositions of the present disclosure are thus preferably essentially free or entirely free of such polyadamantanes and substituted adamantanes and if any such compounds are present, they are present due to being impurities contained in the adamantane purchased commercially and in quantities which in no way affect the advantageous properties of the compositions presently disclosed.

The compositions of the present disclosure may optionally comprise a second sublimable hydrocarbon in the form of cyclododecane (also known in the art as CCD or CDD). The employment of CCD in addition to adamantane may have the advantage of increasing the residence time of the coating on the coated surface. Depending on the particular application at hand and the size, shape and/or type of object on which the 3D scan measurement is to be performed, a shorter or longer residence time of the applied coating may be desired. Accordingly, if a longer scan time per se or a longer period of time between applying the composition/coating to the surface to be scanned and performing the 3D scan itself is foreseen, it may be advantageous that a longer residence time (the time during which sufficient coating remains on the surface to allow a successful scan measurement to be performed) be realized. Accordingly, the employment of a mixture of both adamantane and CCD in the compositions of the present disclosure may furnish coatings exhibiting one or more of the aforementioned advantages while simultaneously providing a coating which resides on the surface to be scanned for a prolonged period relative to coatings generated from compositions containing adamantane as the only sublimable material. Through increasing or decreasing the quantity of CCD relative to adamantane, the residence time of the coating layer may thus be tailored to the specific need of the user without sacrificing the further aforementioned desired properties such as thinness and homogeneity of the coating layer, the quality of 3D scan obtainable, mar resistance, dot adhesion properties, etc. In fact, and entirely contrary to the phenomena observed with prior art compositions employing CCD, the use of a mixture of CCD and adamantane can lead to coating layers of improved thinness relative to those employing adamantane alone. With respect to residence time, a short residence time within the meaning of the present disclosure may be considered to be a residence time of less than 45 minutes. A medium residence time may be considered to be a period between 45 minutes and 24 hours. A long residence time may be considered to be a period exceeding 24 hours. The provision of products capable of being tailored to provide coatings exhibiting any of these residence times while simultaneously delivering excellent performance in terms of one or more (preferably all) of the aforementioned properties thus constitutes an object underlying the present disclosure. The foregoing relates to residence times as measured at room temperature and atmospheric pressure.

The compositions of the present disclosure may be and preferably are solutions. Where the compositions presently disclosed are solutions, all of the sublimable components (adamantane, cyclododecane and any further sublimable components or additives present) in a given composition are fully dissolved in the first solvent or mixture of first and second solvents present in said composition such that the resultant composition is a solution at room temperature.

Where cyclododecane is present in the compositions of the present disclosure, it is preferred that a second solvent which is different from the first solvent also present in the compositions.

The total combined quantity of (i) adamantane and, where present, (iii) cyclododecane in the compositions of the present disclosure may be from 0.5 wt. % or more, 1.0 wt. % or more, 1.5 wt. % or more, 2.5 wt. % or more, 3 wt. % or more, 5 wt. % or more, or 6 wt. % or more to 10 wt. % or less, 11 wt. % or less, 12 wt. % or less, 15 wt. % or less, 20 wt. % or less, 30 wt. % or less, 50 wt. % or less, based on the total weight of components (i) to (iv). With respect to these ranges, the compositions of the present disclosure may, in particular, have a lower end point of 1.5 wt. % or more. With respect to these ranges, the compositions of the present disclosure may preferably have a lower end point of 2.5 wt. % or more. With respect to these ranges, the compositions of the present disclosure may more preferably have a lower end point of 3 wt. % or more. With respect to these ranges, the compositions of the present disclosure may still more preferably have a lower end point of 5 wt. % or more. With respect to these ranges, the compositions of the present disclosure may most preferably have a lower end point of 6 wt. % or more. With respect to these ranges, the compositions of the present disclosure may, in particular, have an upper end point of 20 wt. % or less. With respect to these ranges, the compositions of the present disclosure may preferably have an upper end point of 15 wt. % or less. With respect to these ranges, the compositions of the present disclosure may more preferably have an upper end point of 12 wt. % or less. With respect to these ranges, the compositions of the present disclosure may still more preferably have an upper end point of 11 wt. % or less. With respect to these ranges, the compositions of the present disclosure may most preferably have an upper end point of 10 wt. % or less. The compositions of the present disclosure exhibiting these weight ranges may be free of (iii) cyclododecane. The compositions of the present disclosure exhibiting these weight ranges may contain both (i) adamantane and (iii) cyclododecane.

Preferably, the total combined quantity of (i) adamantane and, where present, (iii) cyclododecane in the compositions of the present disclosure is from 1.5 wt. % or more or 3 wt. % or more to 10 wt. % or less, 11 wt. % or less, 12 wt. % or less, 15 wt. % or less, 20 wt. % or less, 30 wt. % or less, 50 wt. % or less, based on the total weight of components (i) to (iv). More preferably the total combined quantity of (i) adamantane and, where present, (iii) cyclododecane in the compositions of the present disclosure is from 3 wt. % or more to 20 wt. % or 15 wt. % or less, based on the total weight of components (i) to (iv). Still more preferably, the total combined quantity of (i) adamantane and, where present, (iii) cyclododecane in the compositions of the present disclosure is from 3 wt. % or more to 12 wt. % or less or 11 wt. % or less, or even from 5 wt. % or more to 11 wt. % or 10 wt. % or less, based on the total weight of components (i) to (iv). The compositions of the present disclosure exhibiting these weight ranges may be free of (iii) cyclododecane. The compositions of the present disclosure exhibiting these weight ranges may contain both (i) adamantane and (iii) cyclododecane. The compositions of the present disclosure exhibiting these weight ranges may be free of (iii) cyclododecane and the (iv) second solvent and, where this is the case, preferably consist of (i) adamantane and the (ii) first solvent. The compositions of the present disclosure exhibiting these weight ranges may contain both (i) adamantane and (iii) cyclododecane as well as the (iv) second solvent.

In one particularly preferred embodiment of the present disclosure, the composition is free of (iii) cyclododecane and the (iv) second solvent. In a particularly preferred embodiment of the present disclosure, the composition is free of both (iii) cyclododecane and the (iv) second solvent and the total quantity of (i) adamantane is from 3 wt. % or more to 20 wt. % or 15 wt. % or less, based on the total weight of components (i) to (iv), preferably from 5 wt. % or more to 15 wt. % or less or 12 wt. % or less. Particularly preferred in this embodiment is a total quantity of (i) adamantane of 6 wt. % or more to 10 wt. % or less. Within this context, the (i) adamantane may be present in one embodiment in a quantity of 6.25 wt. % based on the total weight of components (i) to (iv). Within this context, the (i) adamantane may be present in one embodiment in a quantity of 10 wt. % based on the total weight of components (i) to (iv). Within the context of these embodiments, the compositions presently disclosed may consist essentially of or consist of (i) adamantane and the (ii) first solvent, i.e. the compositions do not contain any (iii) cyclododecane, (iv) second solvent, or any further additives or components. Within the context of these embodiments, the compositions presently disclosed may consist essentially of or consist of (i) adamantane, the (ii) first solvent and a propellant, i.e. the compositions do not contain any (iii) cyclododecane, (iv) second solvent, or any further additives or components.

In a further particularly preferred embodiment of the present disclosure, the composition comprises (iii) cyclododecane and the total combined quantity of (i) adamantane and (iii) cyclododecane is from 3 wt. % or more to 20 wt. % or 15 wt. % or less, based on the total weight of components (i) to (iv), preferably from 5 wt. % or more to 15 wt. % or less or 12 wt. % or less. Particularly preferred in this embodiment is a total combined quantity of (i) adamantane and (iii) cyclododecane of 6 wt. % or more to 11 wt. % or less. Within this context, the (i) adamantane and (iii)

cyclododecane may be present in one embodiment in a combined quantity of 7 wt. % or more to 11 wt. % or less based on the total weight of components (i) to (iv). Within this context, the (i) adamantane and (iii) cyclododecane may be present in one embodiment in a combined quantity of 9 wt. % or more to 11 wt. % or less based on the total weight of components (i) to (iv), even more preferably in a combined quantity of 10 wt. % based on the total weight of components (i) to (iv). Within this context, the composition of the present disclosure preferably further comprises the (iv) second solvent. Within this context, in an even more preferred embodiment the composition of the present disclosure further comprises camphor and/or menthol, preferably camphor, in an amount of preferably 0.1 wt. % or more to 5 wt. % or less, more preferably from 0.5 wt. % or more to 2.5 wt. % or less, based on the total combined weight of said camphor and/or menthol and each of components (i) to (iv).

In a further preferred embodiment of the present disclosure, the total combined quantity of (i) adamantane and, where present, (iii) cyclododecane in the compositions of the present disclosure may be from 10.0 wt. % or more, 12 wt. % or more, 13 wt. % or more, 15 wt. % or more, 20 wt. % or more, 25 wt. % or more, 30 wt. % or more, 35 wt. % or more, 40 wt. % or more, 45 wt. % or more, 50 wt. % or more, or 55 wt. % or more to 90 wt. % or less, 85 wt. % or less, 80 wt. % or less, 75 wt. % or less, 70 wt. % or less, 65 wt. % or less, or 60 wt. % or less, based on the total weight of components (i) to (iv). In this context, in one aspect the total combined quantity of (i) adamantane and, where present, (iii) cyclododecane may be from 10 wt. % or more to 15 wt. % or less, based on the total weight of components (i) to (iv). In this aspect, the total combined quantity of (i) adamantane and, where present, (iii) cyclododecane is preferably from 12 wt. % or more to 15 wt. % or less, based on the total weight of components (i) to (iv). More preferably in this aspect, the total combined quantity of (i) adamantane and, where present, (iii) cyclododecane is more preferably from 13 wt. % or more to 15 wt. % or less, based on the total weight of components (i) to (iv). In this aspect, the composition is preferably free of (iii) cyclododecane. Still in this context, in a further (second) aspect the total combined quantity of (i) adamantane and, where present, (iii) cyclododecane in the compositions of the present disclosure may be from 10 wt. % or more to 55 wt. % or less, based on the total weight of components (i) to (iv). More preferably in this (second) aspect, the total combined quantity of (i) adamantane and, where present, (iii) cyclododecane in the compositions of the present disclosure is from 10 wt. % or more to 50 wt. % or less, based on the total weight of components (i) to (iv). Still in this context, in yet a further (third) aspect the total combined quantity of (i) adamantane and, where present, (iii) cyclododecane may be from 20 wt. % or more to 90 wt. % or less, from 25 wt. % or more to 85 wt. % or less, from 30 wt. % or more to 80 wt. % or less, from 30 wt. % or more to 75 wt. % or less, from 30 wt. % or more to 70 wt. % or less, or from 30 wt. % or more to 65 wt. % or less, based on the total weight of components (i) to (iv). Preferably in this (third) aspect, the total combined quantity of (i) adamantane and, where present, (iii) cyclododecane is from 35 wt. % or more to 60 wt. % or less, in particular from 35 wt. % or more to 55 wt. % or less, more particularly from 40 wt. % or more to 55 wt. % or less, more preferably from 40 wt. % or more to 50 wt. % or less, most preferably from 45 wt. % or more to 50 wt. % or less, based on the total weight of components (i) to (iv). Also preferred in this (third) aspect is a composition in which the total combined quantity of (i) adamantane and, where present, (iii) cyclododecane is from 30 wt. % or more to 50 wt. % or less or to 40 wt. % or less, or from 35 wt. % or more to 50 wt. % or less or to 45 wt. % or less, preferably from 35 wt. % or more to 40 wt. % or less. In this (third) aspect, the compositions of the present disclosure preferably comprise (iii) cyclododecane. In the present embodiment (i.e. including each of the individual aspects), the compositions preferably comprise the (iv) second solvent which is different to the first solvent. Said (iv) second solvent is preferably ethanol.

In the compositions of the present disclosure and in the context of the foregoing including the preferred embodiments described above and elsewhere herein, the ratio of adamantane to cyclododecane on a weight to weight basis may be from 100:0, 95:5, 90:10, 80:20, 75:25, 2.7:1, 60:40, or 51:49 to 49:51, 40:60, 1:2.7, 25:75, 20:80, 10:90, 5:95, or 1:99. Where a particularly short residence time (less than 45 minutes) of the coating on the surface to be scanned is desired, the use of a ratio of 100:0, i.e. a composition free of cyclododecane, may be appropriate. In general, increasing the quantity of cyclododecane relative to adamantane leads, inter alia, to a prolonged residence time. The ratio of adamantane to cyclododecane on a weight to weight basis may be from 100:0 to 5:95 or 1:99. In particular, the ratio of adamantane to cyclododecane on a weight to weight basis may be from 100:0 to 20:80 or 10:90. Preferably the ratio of adamantane to cyclododecane on a weight to weight basis may be from 100:0 to 25:75. Most preferably the ratio of adamantane to cyclododecane on a weight to weight basis in the compositions of the present disclosure may be from 100:0 to 1:2.7.

Where a prolonged residence time of the coating is desired, the ratio of adamantane to cyclododecane on a weight to weight basis may be desired to be from 95:5 to 5:95 or from 90:10 to 10:90. Where a medium residence time (45 minutes to 24 hours) is desired and the composition comprises cyclododecane, a particularly attractive balance of properties may be obtained using a the ratio of adamantane to cyclododecane on a weight to weight basis from 80:20 to 20:80, in particular from 75:25 to 25:75. Most preferably within this context, the ratio of adamantane to cyclododecane on a weight to weight basis may be from 2.7:1 to 1:2.7. The ratio of adamantane to cyclododecane on a weight to weight basis may also be from 60:40 to 40:60 or 51:49 to 49:51. Particularly preferred in this context where a medium residence time (45 minutes to 24 hours) together with a particularly attractive balance of the other properties described herein as being desired is sought and the composition comprises cyclododecane is the employment of both adamantane and cyclododecane in the compositions of the present disclosure in a ratio of adamantane and cyclododecane on a weight to weight basis of 1:1 to 1:4, in particular 1:1 to 1:3, more particularly 1:2 to 1:3, most particularly 1:2.7. Further in this context, the compositions of the present disclosure may also contain more adamantane than cyclododecane on a weight to weight basis. Where this is the case, the ratio of adamantane to cyclododecane on a weight to weight basis may preferably be from 1.5:1 to 1:1, more preferably from 1.5:1 to 1.25:1, most preferably from 1.4:1 to 1.3:1.

Accordingly, in a further particularly preferred embodiment of the present disclosure in this context, the composition comprises (iii) cyclododecane and the total combined quantity of (i) adamantane and (iii) cyclododecane is from 3 wt. % or more to 20 wt. % or 15 wt. % or less, based on the total weight of components (i) to (iv), preferably from 5 wt. % or more to 15 wt. % or less or 12 wt. % or less.

Particularly preferred in this embodiment is a total combined quantity of (i) adamantane and (iii) cyclododecane of 6 wt. % or more to 11 wt. % or less. Within this context, the (i) adamantane and (iii) cyclododecane may be present in one embodiment in a combined quantity of 7 wt. % or more to 11 wt. % or less based on the total weight of components (i) to (iv). Within this context, the (i) adamantane and (iii) cyclododecane may be present in one embodiment in a combined quantity of 9 wt. % or more to 11 wt. % or less based on the total weight of components (i) to (iv), even more preferably in a combined quantity of 10 wt. % based on the total weight of components (i) to (iv). Within this context, the ratio of adamantane to cyclododecane on a weight to weight basis of is preferably 1:1 to 1:4, more preferably from 1:1 to 1:3, still more preferably from 1:2 to 1:3, and is most particularly 1:2.7. Within this context the compositions of the present disclosure preferably further comprise the (iv) second solvent. Within this context the compositions of the present disclosure may preferably also comprise camphor and/or menthol (preferably camphor), in an amount of preferably 0.1 wt. % or more to 5 wt. % or less, more preferably from 0.5 wt. % or more to 2.5 wt. % or less, most preferably from 0.5 wt. % or more to 1.0 wt. % or less, based on the total combined weight of said camphor and/or menthol and each of components (i) to (v).

Accordingly, in a further particularly preferred embodiment of the present disclosure in this context, the composition comprises (iii) cyclododecane and the total combined quantity of (i) adamantane and (iii) cyclododecane is from 20 wt. % or more to 90 wt. % or less, based on the total weight of components (i) to (iv), preferably from 25 wt. % or more to 85 wt. % or less, or from 30 wt. % or more to 75 wt. % or less, 70 wt. % or less or 65 wt. % or less. Particularly preferred in a first aspect of this embodiment is a total combined quantity of (i) adamantane and (iii) cyclododecane of 35 wt. % or more to 60 wt. % or less. Within the context of this first aspect, the (i) adamantane and (iii) cyclododecane may be present in a combined quantity of 35 wt. % or more to 55 wt. % or less, or of 40 wt. % or more to 55 wt. % or less, based on the total weight of components (i) to (iv). Within the context of this first aspect, the (i) adamantane and (iii) cyclododecane may preferably be present in a combined quantity of 40 wt. % or more to 50 wt. % or less based on the total weight of components (i) to (iv), even more preferably in a combined quantity of 45 wt. % or more to 50 wt. % or less, based on the total weight of components (i) to (iv). Alternatively, in a further (second) aspect of this embodiment the (i) adamantane and (iii) cyclododecane may be present in a combined quantity of from 30 wt. % or more to 50 wt. % or less or to 40 wt. % or less, or from 35 wt. % or more to 50 wt. % or less or to 45 wt. % or less, preferably from 35 wt. % or more to 40 wt. % or less, based on the total weight of components (i) to (iv). Within the context of the present embodiment, the ratio of adamantane to cyclododecane on a weight to weight basis is preferably from 1.5:1 to 1:1, more preferably from 1.5:1 to 1.25:1, most preferably from 1.4:1 to 1.3:1. Within the context of the present embodiment, the compositions of the present disclosure preferably further comprise the (iv) second solvent as defined elsewhere herein. Within this context, if present the (iv) second solvent is preferably ethanol. Within the context of the present embodiment the compositions of the present disclosure may also comprise an additive as defined elsewhere herein, in particular camphor and/or menthol (preferably camphor), in an amount of preferably 0.1 wt. % or more to 5 wt. % or less, more preferably from 0.5 wt. % or more to 2.5 wt. % or less, most preferably from 0.5 wt. % or more to 1.0 wt. % or less, based on the total combined weight of said camphor and/or menthol and each of components (i) to (iv).

The compositions of the present disclosure comprise a first solvent. Said first solvent is a hydrocarbon which has a boiling point of 25° C. or more at atmospheric pressure or a mixture of hydrocarbons which has a boiling point range, said boiling point range having a minimum boiling point of 25° C. or more (i.e. the boiling point of the lowest boiling component of the mixture of hydrocarbons has a boiling point of 25° C. or more) at atmospheric pressure. Said first solvent may be a hydrocarbon or mixture of hydrocarbons which has a boiling point or a boiling point range from 25° C. or more, 30° C. or more, 35° C. or more, or 40° C. or more to 50° C. or less, 60° C. or less, 65° C. or less, 70° C. or less, 75° C. or less, 80° C. or less, 90° C. or less, 100° C. or less, 110° C. or less, 120° C. or less, or 130° C. or less, at atmospheric pressure. In particular, the first solvent may have a boiling point or a boiling point range from 30° C. or more or 35° C. or more to 50° C. or less, 60° C. or less, 65° C. or less, 70° C. or less, 75° C. or less, 80° C. or less, 90° C. or less, 100° C. or less, 110° C. or less, 120° C. or less, or 130° C. or less, at atmospheric pressure. Preferably, the first solvent may have a boiling point or a boiling point range from 35° C. or more or 40° C. or more to 50° C. or less, 60° C. or less, 65° C. or less, 70° C. or less, 75° C. or less, 80° C. or less, 90° C. or less, 100° C. or less, 110° C. or less, 120° C. or less, or 130° C. or less, at atmospheric pressure. More preferably, the first solvent has a boiling point or boiling point range from 35° C. or more to 100° C. or less, in particular 90° C. or less, preferably 80° C. or less, more preferably 75° C. or less, most preferably 70° C. or less. In particularly preferred embodiments, the boiling point or boiling point range of the first solvent is from 40° C. or more to 65° C. or less. In other particularly preferred embodiments, the boiling point or boiling point range of the first solvent is from 45° C. or more to 100° C. or less, and may be from 50° C. or more to 100° C. or less or from 60° C. or more to 95° C. or less. Within the foregoing context, the first solvent may be and is preferably an aliphatic hydrocarbon or mixture of aliphatic hydrocarbons.

The first solvent may be selected from the group consisting of one or more aliphatic straight chain, branched or cyclic $C_5$ to $C_{10}$ hydrocarbons, wherein said hydrocarbons may be saturated or unsaturated. The first solvent may be selected from the group consisting of one or more aliphatic straight chain, branched or cyclic $C_5$ to $C_8$ hydrocarbons, wherein said hydrocarbons may be saturated or unsaturated. Examples of aliphatic straight chain or branched $C_5$ to $C_8$ hydrocarbons which are saturated or unsaturated include pentane, cyclopentane, pentene, cyclopentene, hexane, cyclohexane, hexene, cyclohexene, heptane, cycloheptane, heptene, cycloheptene, octane, cyclooctane, octene, cyclooctene. References to heptene and octene are to be understood to cover all isomers of these compounds.

The first solvent may be selected from the group consisting of pentane, cyclopentane, hexane, cyclohexane, heptane, cycloheptane, octane, petroleum ether, petroleum ether 30-40, petroleum ether 40-60, petroleum ether 40-65, petroleum ether 60-80, petroleum ether 80-100, and any combination of any thereof. Alternatively, the first solvent may be selected from the group consisting of pentane, cyclopentane, hexane, cyclohexane, heptane, cycloheptane, octane, petroleum ether, petroleum ether 30-40, petroleum ether 40-60, petroleum ether 40-65, petroleum ether 60-80, petroleum ether 60-95, petroleum ether 80-100, and any combination of any thereof. As used herein, pentane is to be understood to include n-pentane, iso-pentane, and neopentane, and is preferably n-pentane. As used herein, pentene is to be understood to include 1-pentene, cis-2-pentene, and trans-2-pentene. As used herein, hexane is to be understood to include n-hexane, 2-methylpentane, 3-methylpentane, 2,3-dimethylbutane, and 2,2-dimethylbutane, and is preferably n-hexane. As used herein, hexene is to be understood to include 1-hexene, trans-2-hexene, cis-2-hexene, trans-3-hexene, and cis-3-hexene. As used herein, heptane is to be understood to include n-heptane, 2-methylhexane, 3-methylhexane, 2,2-dimethylpentane, 2,3-dimethylpentane, 2,4-dimethylpentane, 3,3-dimethylpentane, 3-ethylpentane, and 2,2,3-trimethylbutane, and is preferably n-heptane. As used herein, heptene is to be understood to include 1-heptene and all other isomers of heptene. As used herein, octane is to be understood to include n-octane, 2-methylheptane, 3-methylheptane, 4-methylheptane, 3-ethylhexane, 2,2-dimethylhexane, 2,3-dimethylhexane, 2,4-dimethylhexane, 2,5-dimethylhexane, 3,3-dimethylhexane, 3,4-dimethylhexane, 3-ethyl-2-methylpentane, 3-ethyl-3-methylpentane, 2,2,3-trimethylpentane, 2,2,4-trimethylpentane, 2,3,4-trimethylpentane, and 2,2,3,3-tetramethylbutane, and is preferable n-octane. As used herein, octene is to be understood to include 1-octene and all other isomers of octene.

The term "petroleum ether" is widely used and understood by a person skilled in the art. Petroleum ether is a distillation fraction of petroleum and consists or consists essentially of aliphatic hydrocarbons. Different fractions may be collected during petroleum distillation, thus leading to different products defined by the temperature range of the petroleum distillation at atmospheric pressure within which they were collected. For example, petroleum ether 40-65 refers to the fraction of the petroleum distillation collected between 40° C. and 65° C., i.e. the range of hydrocarbon compounds contained therein have boiling points at atmospheric pressure ranging from 40° C. to 65° C. Synonyms in the field for "petroleum ether" include "Wundbenzin", "petroleum spirit", "lignoin", "naphtha", and "petroleum benzine".

The first solvent may be selected from the group consisting of $C_5$-hydrocarbons, $C_6$-hydrocarbons, $C_7$-hydrocarbons, $C_8$-hydrocarbons or any combination of any thereof, wherein said solvent or solvent mixture exhibits a boiling point as defined above. The first solvent may preferably be selected from the group consisting of pentane, cyclopentane, hexane, cyclohexane, heptane, cycloheptane, octane, petroleum ether, petroleum ether 30-40, petroleum ether 40-60, petroleum ether 40-65, petroleum ether 60-80, petroleum ether 60-95, petroleum ether 80-100, and any combination of any thereof. Within this context, the first solvent may be selected from the group consisting of cyclopentane, hexane, cyclohexane, heptane, cycloheptane, octane, petroleum ether, petroleum ether 30-40, petroleum ether 40-60, petroleum ether 40-65, petroleum ether 60-80, petroleum ether 60-95, petroleum ether 80-100, and any combination of any thereof. In some embodiments, the first solvent is not pentane. In some embodiments, the first solvent may contain pentane but is not exclusively pentane. Most preferably, said first solvent is petroleum ether 40-65 or petroleum ether 60-95 or cyclopentane or a mixture of petroleum ether 60-95 and cyclopentane. In the most preferred embodiments, the first solvent comprises cyclopentane. The preceding disclosure relating to specific features concerning the definition or identity of the first solvent may be combined with any of the disclosure provided herein concerning the definition or identity of any of the other components of the compositions disclosed herein and combinations thereof including the adamantane, cyclododecane, the second solvent, any further additives including disclosure relating to their respective quantities in the compositions of the present disclosure.

The compositions of the present disclosure optionally comprise a second solvent which is different to said first solvent. In particular, where cyclododecane is present in the compositions of the present disclosure, it is preferred that a second solvent which is different from the first solvent is also present in the compositions. This second solvent is preferably more polar than the first solvent. Within the context of the present disclosure, by more polar is meant having a higher dielectric constant (c) at a given temperature, such as at room temperature or 25° C.

The second solvent may have a boiling point or boiling point range from 40° C. or more, 50° C. or more, 60° C. or more, 64.7° C. or more, 70° C. or more, 75° C. or more, 80° C. or more, 82° C. or more to 90° C. or less, 100° C. or less, 110° C. or less, 120° C. or less, 130° C. or less, 140° C. or less, 150° C. or less, or 160° C. or less, at atmospheric pressure. Preferably the second solvent has a boiling point or boiling point range from 50° C. or more or 60° C. or more to 90° C. or less, 100° C. or less, 110° C. or less, 120° C. or less, 130° C. or less, 140° C. or less, 150° C. or less, or 160° C. or less, at atmospheric pressure. More preferably, the second solvent has a boiling point or boiling point range from 64.7° C. or more or 70° C. or more to 90° C. or less, 100° C. or less, 110° C. or less, 120° C. or less, 130° C. or less, 140° C. or less, 150° C. or less, or 160° C. or less, at atmospheric pressure. Sill more preferably, the second solvent has a boiling point or boiling point range from 75° C. or more or 80° C. or more to 90° C. or less, 100° C. or less, 110° C. or less, 120° C. or less, 130° C. or less, 140° C. or less, 150° C. or less, or 160° C. or less, at atmospheric pressure. Particularly preferably, the second solvent has a boiling point or boiling point range from 60° C. or more to 90° C. or less or 100° C. or less, at atmospheric pressure. Most preferably, the second solvent has a boiling point or boiling point range from 64.7° C. or more to 100° C. or less, in particular from 70° C. or more to 90° C. or less, more particularly from 75° C. or more to 90° C. or less, most particularly from 75° C. or more to 85° C. or less, at atmospheric pressure. Within the context of the foregoing, the second solvent is preferably one or more alcohols, preferably one or more alcohols selected from the group consisting of $C_1$ to $C_8$ alcohols, in particular one or more alcohols selected from the group consisting of $C_1$ to $C_8$ monoalcohols, most preferably one or more monoalcohols selected from the group consisting of $C_1$ to $C_8$ alkanols and $C_3$ to $C_8$ cycloalkanols.

In the compositions of the present disclosure, where the second solvent is selected from the group consisting of one or more $C_1$ to $C_8$ alkanols and $C_3$ to $C_8$ cycloalkanols, said second solvent is preferably selected from the group consisting of methanol, ethanol, n-propanol, iso-propanol, cyclopropanol, n-butanol, sec-butanol, iso-butanol, tert-butanol, cyclobutanol, n-pentanol, 3-methylbutan-1-ol, 2-methylbutan-1-ol, 2,2-dimethylpropan-1-ol, pentan-3-ol, pentan-2-ol, 3-methylbutan-2-ol, 2-methylbutan-2-ol, cyclopentanol, hexan-1-ol, hexan-2-ol, hexan-3-ol, 2-methylpentan-1-ol, 3-methylpentan-1-ol, 4-methylpentan-1-ol, 2-methylpentan-2-ol, 3-methylpentan-2-ol, 4-methylpentan-2-ol, 2-methylpentan-3-ol, 3-methylpentan-3-ol, 2,2-dimethylbutan-1-ol, 2,3-dimethylbutan-1-ol, 3,3-dimethylbutan-1-ol, 2,3-dimethylbutan-2-ol, 3,3-dimethylbutan-2-ol, 2-ethylbutan-1-01, cyclohexanol, 2-heptanol, 3-heptanol, and 4-heptanol. More preferably, the second solvent is selected from the members of this group which have a boiling point or boiling point range from 60° C. or more to 90° C. or less or 100° C. or less, at atmospheric pressure. Most preferably, the second solvent is selected from the members of this group which have a boiling point or boiling point range from 75° C. or more to 85° C. or less, at atmospheric pressure. Most preferably, the second solvent is iso-propanol or ethanol or a mixture of iso-propanol and ethanol, and is above all preferably ethanol.

The second solvent may be free of ethanol. The second solvent may be free of benzyl alcohol. The second solvent may be free of both ethanol and benzyl alcohol. The composition of the present disclosure may be free of ethanol. The composition of the present disclosure may be free of benzyl alcohol. The composition of the present disclosure may be free of both ethanol and benzyl alcohol.

The compositions of the present disclosure may be free of the (iv) second solvent. Where the compositions of the present disclosure comprise both a (ii) first solvent and (iv) second solvent which is different to the first solvent, each of which being defined as herein above, the ratio of said (ii) first solvent to said (iv) second solvent on a weight to weight basis is not particularly limited and the most important role of the second solvent is to ensure the composition is a solution and not, for example, a suspension. It may also be desirable to vary the quantity of the second solvent relative to the first solvent for, for example, non-technical reasons such as to conform with particular regulatory standards and requirements in a given jurisdiction. This ratio may be widely varied without negatively affecting the desired properties of the coating layer described elsewhere herein. Accordingly, where the compositions of the present disclosure comprise both a (ii) first solvent and (iv) second solvent which is different to the first solvent, each of which being defined as herein above, the ratio of said (ii) first solvent to said (iv) second solvent on a weight to weight basis may be from 99:1, 95:5, 90:10, 80:20, 70:30, 3:1, 2:1, 60:40, or 55:45 to 45:55, 40:60, 1:2, 1:3, 30:70, 20:80, 10:90, 5:95, or 1:99. In any of the compositions disclosed herein comprising both a (ii) first solvent and (iv) second solvent which is different to the first solvent, the ratio of said (ii) first solvent to said (iv) second solvent on a weight to weight basis may be from 99:1 to 1:99. In any of the compositions disclosed herein comprising both a (ii) first solvent and (iv) second solvent which is different to the first solvent, the ratio of said (ii) first solvent to said (iv) second solvent on a weight to weight basis may be from 95:1 to 1:95. In any of the compositions disclosed herein comprising both a (ii) first solvent and (iv) second solvent which is different to the first solvent, the ratio of said (ii) first solvent to said (iv) second solvent on a weight to weight basis may be from 90:10 to 10:90. In any of the compositions disclosed herein comprising both a (ii) first solvent and (iv) second solvent which is different to the first solvent, the ratio of said (ii) first solvent to said (iv) second solvent on a weight to weight basis may preferably be from 80:20 to 20:80. In any of the compositions disclosed herein comprising both a (ii) first solvent and (iv) second solvent which is different to the first solvent, the ratio of said (ii) first solvent to said (iv) second solvent on a weight to weight basis may more preferably be from 3:1 to 1:3. The ratio of said (ii) first solvent to said (iv) second solvent on a weight to weight basis may be from 70:30 to 30:70. The ratio of said (ii) first solvent to said (iv) second solvent on a weight to weight basis may be from 2:1 to 1:2.

The ratio of said (ii) first solvent to said (iv) second solvent on a weight to weight basis may also be from 60:40 to 40:60 or 55:45 to 45:55. As demonstrated herein, an excellent balance of the desired coating properties is seen through employment of both the (ii) first solvent and said (iv) second solvent in the compositions of the present disclosure in a ratio of said (ii) first solvent to said (iv) second solvent on a weight to weight basis of 6:1 to 1:1, in particular 5:1 to 2:1, more particularly 5:1 to 3:1, most particularly 4:1. Where a short residence time is desired, it is preferable that neither (iii) cyclododecane nor the (iv) second solvent are employed.

As outlined above, however, it may be desirable to vary the relative quantity of the two solvents such that, for example, a ratio of around 1:1 on a weight to weight basis or even an excess of the second solvent relative to the first solvent on a weight to weight basis is present. Accordingly, where the compositions of the present disclosure comprise both a (ii) first solvent and (iv) second solvent which is different to the first solvent, each of which being defined as herein above, the ratio of said (ii) first solvent to said (iv) second solvent on a weight to weight basis may be from 55:45, 1:1, or 45:55 to 40:60, 1:2, 30:70, 20:80, 10:90, 5:95, or 1:99. In such a situation, the ratio of said (ii) first solvent to said (iv) second solvent on a weight to weight basis may be from 1:1, 45:55 or 40:60 to 5:95, for example from 40:60 to 5:95 or preferably from 40:60 to 10:90. In such a situation, the ratio of said (ii) first solvent to said (iv) second solvent on a weight to weight basis may more preferably be from 40:60 to 20:80.

Particularly preferred in compositions which do not contain (iii) cyclododecane is a ratio of said (ii) first solvent to said (iv) second solvent on a weight to weight basis from 3:1 to 2:1. Particularly preferred in compositions which do contain (iii) cyclododecane is a ratio of said (ii) first solvent to said (iv) second solvent on a weight to weight basis of 3:1 to 1:1.

Accordingly, where the compositions disclosed herein comprise both a (ii) first solvent and a (iv) second solvent, it may be particularly preferred that the second solvent is selected from the group consisting of methanol, ethanol, n-propanol, iso-propanol, cyclopropanol, n-butanol, sec-butanol, iso-butanol, tert-butanol, cyclobutanol, n-pentanol, 3-methylbutan-1-ol, 2-methylbutan-1-ol, 2,2-dimethylpropan-1-ol, pentan-3-ol, pentan-2-ol, 3-methylbutan-2-ol, 2-methylbutan-2-ol, cyclopentanol, hexan-1-ol, hexan-2-ol, hexan-3-ol, 2-methylpentan-1-ol, 3-methylpentan-1-ol, 4-methylpentan-1-ol, 2-methylpentan-2-ol, 3-methylpentan-2-ol, 4-methylpentan-2-ol, 2-methylpentan-3-ol, 3-methylpentan-3-ol, 2,2-dimethylbutan-1-ol, 2,3-dimethylbutan-1-ol, 3,3-dimethylbutan-1-ol, 2,3-dimethylbutan-2-ol, 3,3-dimethylbutan-2-ol, 2-ethylbutan-1-ol, cyclohexanol, 2-heptanol, 3-heptanol, and 4-heptanol, more preferably from the members of this group which have a boiling point or boiling point range from 60° C. or more to 90° C. or less or 100° C. or less (more preferably from 75° C. or more to 85° C. or less), at atmospheric pressure, and most preferably that the second solvent is iso-propanol or ethanol or a mixture of iso-propanol and ethanol, and is above all preferably ethanol; and that the ratio of said (ii) first solvent to said (iv) second solvent on a weight to weight basis is from 6:1 to 1:1, in particular from 5:1 to 2:1, preferably from 5:1 to 3:1, most preferably 4:1, on a weight to weight basis. Within this context, particularly preferred in compositions which do not contain (iii) cyclododecane is a ratio of said (ii) first solvent to said (iv) second solvent on a weight to weight basis from 3:1 to 2:1. Within this context, particularly preferred in compositions which do contain (iii) cyclododecane is a ratio of said (ii) first solvent to said (iv) second solvent on a weight to weight basis of 3:1 to 1:1.

In the compositions of the present disclosure which contain (i) adamantane, (ii) a first solvent, (iii) cyclododecane, and (iv) a second solvent which is different to said first solvent, it is particularly preferred that the ratio of (i) to (ii) on a weight to weight basis is from 1:5 to 1:50, and is most preferably from 1:20 to 1:30 or is from 5:1 to 1:5 or from 3:1 to 1:2, and is most preferably 3:1 to 1:1, and that the ratio of (iii) to (iv) on a weight to weight basis is from 1:1 to 1:5, and is most preferably 1:2.5 or 1:4.

In a further particularly preferred embodiment of the present disclosure, the composition comprises (iii) cyclododecane and the total combined quantity of (i) adamantane and (iii) cyclododecane is from 3 wt. % or more to 20 wt. % or 15 wt. % or less, based on the total weight of components (i) to (iv), preferably from 5 wt. % or more to 15 wt. % or less or 12 wt. % or less. Particularly preferred in this embodiment is a total combined quantity of (i) adamantane and (iii) cyclododecane of 6 wt. % or more to 11 wt. % or less. Within this context, the (i) adamantane and (iii) cyclododecane may be present in one embodiment in a combined quantity of 7 wt. % or more to 11 wt. % or less based on the total weight of components (i) to (iv). Within this context, the (i) adamantane and (iii) cyclododecane may be present in one embodiment in a combined quantity of 9 wt. % or more to 11 wt. % or less based on the total weight of components (i) to (iv), even more preferably in a combined quantity of 10 wt. % based on the total weight of components (i) to (iv). Within this context, the composition of the present disclosure preferably further comprises the (iv) second solvent and the second solvent is as defined elsewhere herein and is preferably isopropanol. The ratio of the (ii) first solvent to the (iv) second solvent on weight to weight basis in this context may be from 99:1, 95:5, 90:10, 80:20, 70:30, 2:1, 60:40, or 55:45 to 45:55, 40:60, 1:2, 30:70, 20:80, 10:90, 5:95, or 1:99 and is preferably from 90:10 or 80:20 to 30:70 or 20:80. Within this context, in an even more preferred embodiment the composition of the present disclosure further comprises camphor and/or menthol, preferably camphor, in an amount of preferably 0.1 wt. % or more to 5 wt. % or less, more preferably from 0.5 wt. % or more to 2.5 wt. % or less, based on the total combined weight of said camphor and/or menthol and each of components (i) to (iv).

In a further particularly preferred embodiment of the present disclosure in this context, the composition comprises (iii) cyclododecane and the total combined quantity of (i) adamantane and (iii) cyclododecane is from 3 wt. % or more to 20 wt. % or 15 wt. % or less, based on the total weight of components (i) to (iv), preferably from 5 wt. % or more to 15 wt. % or less or 12 wt. % or less. Particularly preferred in this embodiment is a total combined quantity of (i) adamantane and (iii) cyclododecane of 6 wt. % or more to 11 wt. % or less. Within this context, the (i) adamantane and (iii) cyclododecane may be present in one embodiment in a combined quantity of 7 wt. % or more to 11 wt. % or less based on the total weight of components (i) to (iv). Within this context, the (i) adamantane and (iii) cyclododecane may be present in one embodiment in a combined quantity of 9 wt. % or more to 11 wt. % or less based on the total weight of components (i) to (iv), even more preferably in a combined quantity of 10 wt. % based on the total weight of components (i) to (iv). Within this context, the ratio of adamantane to cyclododecane on a weight to weight basis is preferably 1:1 to 1:4, more preferably from 1:1 to 1:3, still more preferably from 1:2 to 1:3, and is most particularly 1:2.7. Within this context the compositions of the present disclosure preferably further comprise the (iv) second solvent and the second solvent is as defined elsewhere herein and is preferably isopropanol. The ratio of the (ii) first solvent to the (iv) second solvent on weight to weight basis in this context may be from 99:1, 95:5, 90:10, 80:20, 70:30, 2:1, 60:40, or 55:45 to 45:55, 40:60, 1:2, 30:70, 20:80, 10:90, 5:95, or 1:99 and is preferably from 90:10 or 80:20 to 30:70 or 20:80. Within this context the compositions of the present disclosure may preferably also comprise camphor and/or menthol (preferably camphor), in an amount of preferably 0.1 wt. % or more to 5 wt. % or less, more preferably from 0.5 wt. % or more to 2.5 wt. % or less, most preferably from 0.5 wt. % or more to 1.0 wt. % or less, based on the total combined weight of said camphor and/or menthol and each of components (i) to (iv).

In a further particularly preferred embodiment of the present disclosure, the composition comprises (iii) cyclododecane and the total combined quantity of (i) adamantane and (iii) cyclododecane is from 20 wt. % or more to 90 wt. % or less, based on the total weight of components (i) to (iv), preferably from 25 wt. % or more to 85 wt. % or less, or from 30 wt. % or more to 75 wt. % or less, 70 wt. % or less or 65 wt. % or less. Particularly preferred in a first aspect of this embodiment is a total combined quantity of (i) adamantane and (iii) cyclododecane of 35 wt. % or more to 60 wt. % or less. Within the context of this first aspect, the (i) adamantane and (iii) cyclododecane may be present in a combined quantity of 35 wt. % or more to 55 wt. % or less, or of 40 wt. % or more to 55 wt. % or less, based on the total weight of components (i) to (iv). Within the context of this first aspect, the (i) adamantane and (iii) cyclododecane may preferably be present in a combined quantity of 40 wt. % or more to 50 wt. % or less based on the total weight of components (i) to (iv), even more preferably in a combined quantity of 45 wt. % or more to 50 wt. % or less, based on the total weight of components (i) to (iv). Alternatively, in a further (second) aspect of this embodiment the (i) adamantane and (iii) cyclododecane may be present in a combined quantity of from 30 wt. % or more to 50 wt. % or less or to 40 wt. % or less, or from 35 wt. % or more to 50 wt. % or less or to 45 wt. % or less, preferably from 35 wt. % or more to 40 wt. % or less, based on the total weight of components (i) to (iv). Within the context of the present embodiment, the ratio of adamantane to cyclododecane on a weight to weight basis of is preferably from 1.5:1 to 1:1, more preferably from 1.5:1 to 1.25:1, most preferably from 1.4:1 to 1.3:1. Within the context of the present embodiment, the compositions of the present disclosure preferably further comprise the (iv) second solvent as defined elsewhere herein. Within this context, if present the (iv) second solvent is preferably ethanol. The ratio of the (ii) first solvent to the (iv) second solvent on weight to weight basis in the context of the present embodiment may be from 99:1, 95:5, 90:10, 80:20, 70:30, 2:1, 60:40, or 55:45 to 45:55, 40:60, 1:2, 30:70, 20:80, 10:90, 5:95, or 1:99 and is preferably from 3:1 or 2:1 to 1:3 or 1:2, most preferably from 3:1 to 1:1. Within the context of the present embodiment, the compositions of the present disclosure may also comprise camphor and/or menthol (preferably camphor), in an amount of preferably 0.1 wt. % or more to 5 wt. % or less, more preferably from 0.5 wt. % or more to 2.5 wt. % or less, most preferably from 0.5 wt. % or more to 1.0 wt. % or less, based on the total combined weight of said camphor and/or menthol and each of components (i) to (iv).

Although the quantity of the second solvent is not particularly limited, such to guarantee an excellent profile in respect of the desired coating properties outlined herein irrespective of residence time, where both (iii) cyclododecane and (iv) a second solvent are present in the compositions of the present disclosure it may be preferable that the ratio of (iii) to (iv) on a weight to weight basis is from 1:1 to 1:5, more preferably from 1:1.15 to 1:3.5.

The compositions of the present disclosure may, in addition to components (i) to (iv), further comprise one or more additives. The additives may be used to afford the compositions of the present disclosure any number of properties desirable and standard in the field of 3D scanning spray products. In particular, the compositions of the present disclosure may further comprise a smell-masking agent. This smell masking agent may find particular use in the compositions of the present disclosure which comprise CCD, a compound which the end user may deem to have an unpleasant odour. Accordingly, the compositions of the present disclosure may comprise an additive capable of masking the smell of CCD. Examples of such additives are camphor and menthol. As such, the compositions of the present disclosure may comprise as an additive camphor, menthol or a combination thereof. A further example of such an additive is limonene, in particular D-limonene. As such, the compositions of the present disclosure may comprise as an additive limonene, in particular D-limonene. The compositions of the present disclosure may thus comprise as an additive camphor, menthol, limonene (in particular D-limonene) or any combination of any thereof. Within this context, the one or more additives may be present in the compositions of the present disclosure in any amount necessary to mask the smell of CCD, in particular in an amount of from 0.1 wt. % or more, 0.25 wt. % or more, or 0.5 wt. % or more to 1.0 wt. % or less, 1.5 wt. % or less, 2.5 wt. % or less, or 5 wt. % or less, based on the total combined weight of said additives and each of components (i) to (iv). Preferably, the one or more additives is present in an amount of 0.1 wt. % or more to 5 wt. % or less, more preferably from 0.25 wt. % or more to 2.5 wt. % or less, still more preferably from 0.5 wt. % or more to 1.5 wt. % or less, most preferably from 0.5 wt. % or more to 1.0 wt. % or less based on the total combined weight of said additives and each of components (i) to (iv). Particularly suitable within this context may be a ratio of camphor and/or menthol, preferably camphor, to CCD of 1:5 to 1:20, preferably 1:8 on a weight to weight basis. Further particularly suitable within this context may be a ratio of camphor, menthol, limonene (in particular D-limonene) or any combination of any thereof, preferably camphor, to CCD of 1:5 to 1:20, preferably 1:8 on a weight to weight basis.

The type of surface on which the compositions of the present disclosure can be employed to provide a coating layer exhibiting the properties and advantages described herein is not particularly restricted. Accordingly, the compositions of the present disclosure may be employed to form coating layers on, inter alia, glass surfaces, metal surfaces, polymeric surfaces, acrylic surfaces, wooden surfaces, enamel surfaces, textile (e.g. woven fabric, non-woven fabric, or leather) surfaces, ceramic surfaces and any other type of surface which may require improvement in terms of its ability to allow the generation of a high quality 3D scan thereof. Of particular importance are surfaces of the aforementioned types which are transparent, translucent, light-absorbing, reflective and/or exhibit gloss finishes. Typically, such surfaces may be surfaces of parts (including mechanical component parts), particularly metallic parts, which find use in the field of precision engineering. As outlined hereinabove, an object prepared for optical scanning through application of a coating based on the composition of the present disclosure should ideally be returned post-measurement in its original, unchanged, uncoated state, in particular without the need to have to undertake actions such as cleaning or wiping of the surface to effect removal of the coating. Accordingly, the compositions of the present disclosure should ideally not cause any change (structural, surface-realte etc.) to the object onto which they are applied. As such, the components of the compositions of the present disclosure should ideally be chemically inert towards the surfaces onto which said compositions are applied. When applied to, for example, polymeric or acrylic objects, it is thus important that the components do not react with, dissolve or in any other way impair the surface of said objects. Accordingly, the compositions of the present disclosure are preferably free of components which may impair polymeric or acrylic surfaces, for example of solvents which may impair polymeric or acrylic surfaces. Examples of such solvents include ketones such as $C_{3-13}$ dialkyl ketones (i.e. ketones in which the carbonyl group is flanked on either side by an alkyl group, the ketone compound containing a total of 3 to 13 carbon atoms), in particular acetone, and methylethylketone. The compositions of the present technology are thus preferably free (or essentially free) of acetone and/or methylethylketone, more preferably free (or essentially free) of acetone and methylethylketone. By omitting such compounds/solvents from the compositions of the present disclosure, the versatility of the said compositions in respect of compatibility with the types of different objects that can be scanned is increased. By essentially free is meant that the species may be present in minor quantities (for example, as impurities in other components present in the composition at hand—commercially available solvents may, for example, contain minor quantities of acetone or methylethylketone as unwanted impurities) which do not affect the desired properties taught herein to be associated with the compositions of the present technology. Essentially free in this context may thus mean that the species from which the composition in question is essentially free may be present in an amount of 1000 ppm or less, 750 ppm or less, 500 ppm or less, 300 ppm or less, 200 ppm or less, 100 ppm or less, 50 ppm or less, or 10 ppm or less. Preferably, the compositions of the present technology are free of $C_{3-13}$ dialkyl ketones. Preferably, the compositions of the present technology are free of acetone. Preferably, the compositions of the present technology are free of methylethylketone.

The compositions of the present disclosure may be employed to provide thin (for example 50 µm or less, 20 µm or less, 10 µm or less, or even 5 µm or less), highly homogenous, scannable coatings on surfaces of objects, in particular in order to afford surfaces which enable precise, high quality, high resolution 3D scans of said objects to be generated. Accordingly, the compositions of the present disclosure find use in 3D scanning applications, in particular in preparing the surface of an object for a 3D scan measurement and/or facilitating the 3D scanning measurements and/or generating 3D scans of objects. As such, the compositions of the present disclosure can be employed to increase the scannability, scan quality, scan precision and/or scan resolution of an object, in particular in relation to 3D scans of said object. By scannability is meant the ability of an object to allow a 3D scan thereof to be reliably generated. The compositions may achieve this through and thus find use in increasing the diffuseness of light reflected from an object, particularly from an object on which a 3D scan is to be performed thus leading to increased scannability, scan precision, scan quality and/or scan resolution. The compositions of the present disclosure may find further use in providing any other advantages taught herein to be associated therewith. For example, the compositions of the present disclosure may find use in preparing surfaces of objects for scan measurements and, in particular, 3D scan measurements. Furthermore, the compositions of the present disclosure may be used to provide such coated surfaces which additionally exhibit excellent mar resistance, adhesion of, inter alia, reference dots required by the scanner to produce 3D scan measurements, the ability to allow removal and re-adhesion of such dots without significantly degrading the surface quality, and/or weatherability such as durability against direct contact with running water. The compositions of the present disclosure may be used to prepare surfaces already protected by or coated with films of, for example, oil or lubricants for 3D scan measurements.

The present disclosure thus also relates to a method of preparing the surface of an object for a 3D scan measurement, said method comprising the step of applying any composition according to the present disclosure to the surface to be scanned. The method may further comprise the step of allowing the (ii) first solvent and, where present, (iv) second solvent to at least partially and preferably entirely evaporate in order to give rise to a coating on said surface. Said coating is preferably non-liquid and/or a non-solution. Said coating preferably gives rise to a surface which exhibits increased opaqueness relative to the corresponding uncoated surface and is most preferably opaque. Said coating is preferably solid at room temperature. Said coating preferably comprises predominantly (i) adamantane and, where present, (iii) cyclododecane (and any further additives employed in the composition) but may further comprise residual quantities of the (ii) first solvent and, where present in the composition of the present disclosure, the (iv) second solvent. Residual may mean less than 10 wt. %, more preferably less than 5 wt. %, still more preferably less than 2 wt. %, most preferably less than 1 wt. % based on the total weight of the coating. Said coating is preferably essentially free of residual solvent. The present disclosure further relates to a method of producing a 3D scan of an object, said method comprising the aforementioned step or steps for preparing the surface of the object for a 3D scan measurement and the additional subsequent step of performing a 3D scan measurement of said object.

The compositions of the present disclosure can be applied to the surface to be coated by any means known by the skilled person and/or standard in the art for applying coatings to surfaces such to prepare them for a 3D scan measurement. In particular, the compositions of the present disclosure may be applied to the respective surface through, for example, spraying (with or without employment of a propellant or aerosol), dipping the object or surface in the composition, or application of the composition to the surface using an appropriate implement known in the field such as, for example, with a brush.

Particularly preferred is the application of the compositions of the present disclosure to the surface to be coated by spraying. Application by spraying can be conducted using any of the standard methods known in the art for applying coatings to surfaces by spraying such to prepare them for a 3D scan measurement. For example, the compositions of the present disclosure may be applied using air brush technology or by pressurizing them with a propellant gas in spray cans or vessels standard in the art for such applications (and to pressures standard in the art for such products) and using said propellant gas to carry/propel the compositions to the surface to be coated upon release from said cans or vessels. These are methods which are well known to the skilled person. For example, application through spraying in this manner may typically be conducted at a distance of 30 cm (or even 15 to 20 cm) from the surface to be coated. The type of "spray-head" ("Sprühkopf") employed on the can, vessel or airbrush may be selected from those commonly available and used in the art and may be matched to any particular requirements of the spray operation and/or the type of object at hand to be sprayed. Most preferably, the air brush or spray head exhibits the measurements and properties of those employed in the experimental procedures disclosed herein, for example a "spray head" with a nozzle diameter of 0.51 (+/−0.02) mm or an airbrush with a nozzle diameter of 0.8 mm. Alternatively, a "spray head" with a broader nozzle diameter may be employed, for example with a diameter of 4 mm. The "spray heads" employed in the context of the present disclosure preferably deliver continuous dosage upon activation. The "spray heads" employed in the context of the present disclosure are preferably compatible with both BOV and vertical valve types. In addition to those employed in the experimental procedures disclosed herein, a further example of an application system suitable for applying the compositions of the invention is an aerosol can (for example, a 400 ml can of 65 mm diameter and 157 mm tall) fitted with a ball valve stem (for example of 4 mm diameter, e.g. an Ariane-ball valve stem of 4 mm diameter) and a "spray head", for example a "spray head" with a 4 mm nozzle diameter. The spray head may exhibit a "fit in" neck finish, be compatible with BOV and vertical valves and deliver continuous dosage. In this regard, where commercial product names or trademarks are used herein to describe these or any other products, the properties, measurements, dimensions, compositions etc. of said products are to be understood to be those of the corresponding products available under said names or trademarks on the filing date (priority date where applicable) of the present application.

Accordingly, the compositions of the present disclosure may further comprise a propellant. A propellant is not to be considered an "additive" within the context in which the term "additive" is used in the present disclosure. The propellant may be any propellant known in the art for use in aerosol sprays. Such propellants are well known to the skilled person. The propellant may preferably be selected from the group consisting of butane, propane, isobutane and any combination of any thereof. A typical propellant in this context is a mixture of butane:propane:isobutane in a ratio of 74:23:3 on a weight to weight basis. Where present in the compositions of the present disclosure, the propellant may, relative to the other components of the composition, be employed in any amount sufficient to propel the composition onto the desired surface. Particularly, when a propellant is comprised in the compositions of the present disclosure, it may be present in said compositions in a quantity of 30 wt. % or more, 35 wt. % or more, or 40 wt. % or more to 50 wt. % or less, 60 wt. % or less or 70 wt. % or less, based on the total weight of the composition. Within this context, the propellant is preferably present in a quantity of 30 wt. % or more to 70 wt. % or less, more preferably from 35 wt. % or more to 60 wt. % or less, most preferably from 40 wt. % or more to 50 wt. % or less, based on the total weight of the composition.

As an alternative to the above-listed propellant(s), carbon dioxide may be employed. As such, carbon dioxide may be employed as the propellant in the compositions of the present disclosure in the quantities stipulated in the preceding paragraph. Alternatively, pressurised air may be used as the propellant in the compositions of the present disclosure and may be employed in the quantities stipulated in the preceding paragraph.

The compositions of the present disclosure may also be applied to the surface to be coated without the use of a propellant or pressurised gas. For example, they may be applied using a spray bottle, for example a spray bottle fitted with a hand-operated atomiser/nebuliser/spray-head.

In addition to 3D scanning technology, the optical measurement technology applications for which the compostions of the present technology are suitable for use in also include photogrammetry. Accordingly, in one embodiment the compositions of the present technology are used in photogrammetry, for example, to prepare the surface of an object for optical measurement by photogrammetry. The compositions of the present technology can be used to increase the quality and/or resolution of a scan of an object, wherein said scan is conducted using photogrammetry. The compositions of the present technology can be used to improve the scannability by photogrammetry of a surface, i.e. the susceptibility of a surface to allowing a photogrammetry scan of it to be produced. Accordingly, the present disclosure relates to a method of improving the scannability by photogrammetry of a surface, said method comprising the step of applying a composition of the present technology to the surface to be scanned by photogrammetry. The present disclosure also relates to a method of preparing the surface of an object for a photogrammetry scan measurement, said method comprising the step of applying a composition according to the present technology to the surface to be scanned. The present disclosure also relates to a method of producing a photogrammetry scan of an object, said method comprising the steps of 1) applying a composition according to the present technology to the surface of the object to be scanned, and 2) performing a photogrammetry scan measurement.

The compositions of the present disclosure may be employed to provide thin (for example 50 µm or less, 20 µm or less, 10 µm or less, or even 5 µm or less), highly homogenous, scannable coatings on surfaces of objects, in particular in order to afford surfaces which enable precise, high quality, high resolution photogrammetry scans of said objects to be generated. Accordingly, the compositions of the present disclosure find use in photogrammetry (scanning) applications, in particular in preparing the surface of an object for a photogrammetry (scan) measurement and/or facilitating the photogrammetry (scanning) measurements and/or generating photogrammetry scans of objects. As such, the compositions of the present disclosure can be employed to increase the scannability, scan quality, scan precision and/or scan resolution of an object, in particular in relation to photogrammetry scans of said object. By scannability is meant the ability of an object to allow a photgrammetry scan thereof to be reliably generated. The compositions may achieve this through and thus find use in increasing the diffuseness of light reflected from an object, particularly from an object on which a photogrammetry measurement/scan is to be performed thus leading to increased scannability, scan precision, scan quality and/or scan resolution. The compositions of the present disclosure may find further use in providing any other advantages taught herein to be associated therewith. For example, the compositions of the present disclosure may find use in preparing surfaces of objects for scan measurements and, in particular, photogrammetry (scan) measurements. Furthermore, the compositions of the present disclosure may be used to provide such coated surfaces which additionally exhibit excellent mar resistance, adhesion of, inter alia, reference dots required by the measuring device (e.g. camera) to produce photgrammetry (scan) measurements, the ability to allow removal and re-adhesion of such dots without significantly degrading the surface quality, and/or weatherability such as durability against direct contact with running water. The compositions of the present disclosure may be used to prepare surfaces already protected by or coated with films of, for example, oil or lubricants for photogrammetry (scan) measurements.

The present disclosure thus also relates to a method of preparing the surface of an object for a photogrammetry (scan) measurement, said method comprising the step of applying any composition according to the present disclosure to the surface to be measured/scanned. The method may further comprise the step of allowing the (ii) first solvent and, where present, (iv) second solvent to at least partially and preferably entirely evaporate in order to give rise to a coating on said surface. Said coating is preferably non-liquid and/or a non-solution. Said coating preferably gives rise to a surface which exhibits increased opaqueness relative to the corresponding uncoated surface and is most preferably opaque. Said coating is preferably solid at room temperature. Said coating preferably comprises predominantly (i) adamantane and, where present, (iii) cyclododecane (and any further additives employed in the composition) but may further comprise residual quantities of the (ii) first solvent and, where present in the composition of the present disclosure, the (iv) second solvent. Residual may mean less than 10 wt. %, more preferably less than 5 wt. %, still more preferably less than 2 wt. %, most preferably less than 1 wt. % based on the total weight of the coating. Said coating is preferably essentially free of residual solvent. The present disclosure further relates to a method of producing a photogrammetry scan/measurement of an object, said method comprising the aforementioned step or steps for preparing the surface of the object for a photogrammetry scan/measurement and the additional subsequent step of performing a photgrammetry scan/measurement of said object.

The compositions of the present disclosure can be applied to the surface to be coated by any means known by the skilled person and/or standard in the art for applying coatings to surfaces such to prepare them for a photogrammetry scan/measurement. In particular, the compositions of the present disclosure may be applied to the respective surface through, for example, spraying (with or without employment of a propellant or aerosol), dipping the object or surface in the composition, or application of the composition to the surface using an appropriate implement known in the field such as, for example, with a brush.

Particularly preferred is the application of the compositions of the present disclosure to the surface to be coated by spraying. Application by spraying can be conducted using any of the standard methods known in the art for applying coatings to surfaces by spraying such to prepare them for a photogrammetry scan/measurement. For example, the compositions of the present disclosure may be applied using air brush technology or by pressurizing them with a propellant gas in spray cans or vessels standard in the art for such applications (and to pressures standard in the art for such products) and using said propellant gas to carry/propel the compositions to the surface to be coated upon release from said cans or vessels. These are methods which are well known to the skilled person. For example, application through spraying in this manner may typically be conducted at a distance of 30 cm (or even 15 to 20 cm) from the surface to be coated. The type of "spray-head" ("Sprühkopf") employed on the can, vessel or airbrush may be selected from those commonly available and used in the art and may be matched to any particular requirements of the spray operation and/or the type of object at hand to be sprayed. Most preferably, the air brush or spray head exhibits the measurements and properties of those employed in the experimental procedures disclosed herein, for example a "spray head" with a nozzle diameter of 0.51 (+/−0.02) mm or an airbrush with a nozzle diameter of 0.8 mm. Alternatively, a "spray head" with a broader nozzle diameter may be employed, for example with a diameter of 4 mm. The "spray heads" employed in the context of the present disclosure preferably deliver continuous dosage upon activation. The "spray heads" employed in the context of the present disclosure are preferably compatible with both BOV and vertical valve types. In addition to those employed in the experimental procedures disclosed herein, a further example of an application system suitable for applying the compositions of the present disclosure is an aerosol can (for example, a 400 ml can of 65 mm diameter and 157 mm tall) fitted with a ball valve stem (for example of 4 mm diameter, e.g. an Ariane-ball valve stem of 4 mm diameter) and a "spray head" with a 4 mm nozzle diameter. The spray head may exhibit a "fit in" neck finish, be compatible with BOV and vertical valves and deliver continuous dosage. In this regard, where commercial product names or trademarks are used herein to describe these or any other products, the properties, measurements, dimensions, compositions etc. of said products are to be understood to be those of the corresponding products available under said names or trademarks on the filing date (priority date where applicable) of the present application.

The compositions of the present technology may find use in a range of further applications. These include, for example, the furnishing of general (temporary) markings such as markings on walls, floors, roads, pavements, sidewalks, the ground etc. (e.g. in the fields of construction, road works, or forensics); the temporary blockage of optical fibres; the adjustment of white balance in the fields of photography and film; reducing the reflectiveness of surfaces, for example, in the fields of photography and film; as coatings to facilitate the identification of surface deformities or inconsistencies (e.g. dents), for example in surfaces such as metal surfaces, in particular in the automotive and aviation fields; as a carrier medium for (complex) lubricants and oils; in the dental industry, in particular in facilitating the generation of replications of teeth and gums for potential use in the manufacture of dental prosthetics such as dentures, dental implants, crowns, bridges etc.; in OMV (on machine verification); for (temporarily) disabling photoelectric sensors, optical/light barriers etc.; for preparing surfaces for dynamic measurements such as real-time measurement of deformations (e.g. by laser doppler velocimetry, Aramis, Argus, Pontus, etc.); in laser holography; as protective coatings; as coatings (both protective and for optimising surfaces for optical measurement) in the field of archaeology; in wood restoration. Further applications include in the field of (sheet) metal welding to temporarily highlight touch out/marking scratches (both in automated and manual marking processes), in the field of die-spotting/blueing for (functional) surfaces to fit them perfectly and as a release agent in demolding processes.

Within the meaning of the present disclosure, a compound is sublimable if, particularly at room temperature and atmospheric pressure, it passes from the solid phase directly to the gas phase without passing through an intermediate liquid phase.

The composition of the present technology may be free of endotrimethylenenorbornene. The compositions of the present technology may be free of glycolethers. The compositions of the present technology may be free of alkyl ethers of alkylene glycols, in particular mono- and di-alkyl ethers of alkylene glycols. The compositions of the present technology may be and are preferably free of conventional rust inhibitors, in particular morpholine, diisopropylamine, dicyclohexylamine, diisobutylamine, piperidine, propargyl alcohol, 2-butyne-1-ol or any combination of any thereof. Preferably, the compositions of the present technology are free from all of the aforementioned compounds.

As employed herein, the term "comprising" is to be understood to also cover the alternative in which the product/method/use in respect of which the term "comprising" is used may also "consist exclusively of" the subsequently-described elements.

As employed herein, the term "comprising" is to be understood to also cover the alternative in which the product/method/use in respect of which the term "comprising" is used may also "consist essentially of" the subsequently-described elements.

Where a numerical range is disclosed herein, such range is continuous, inclusive of both the minimum and maximum values of the range as well as every value between such minimum and maximum values. Still further, where a range refers to integers, every integer between the minimum and maximum values of such range is included. In addition, where multiple ranges are provided to describe a feature or characteristic, such ranges can be combined. That is to say that, unless otherwise indicated, all ranges disclosed herein are to be understood to encompass any and all sub-ranges subsumed therein. For example, a stated range of from "1 to 10" should be considered to include any and all sub-ranges between the minimum value of 1 and the maximum value of 10 inclusive of the values 1 and 10. Exemplary sub-ranges of the range 1 to 10 include, but are not limited to, 1 to 6.1, 3.5 to 7.8, and 5.5 to 10. It is to be understood that the upper and lower amount, range, and ratio limits set forth herein may be independently combined. Similarly, each element or feature of the present disclosure taught to be present in a given range or amount can be combined within a respective embodiment with the other elements of said embodiment, said other elements likewise being present in the ranges or amounts taught herein for said other elements. All ranges and amounts for one element of an embodiment can be combined with all ranges and amounts of the other elements in said embodiment. As such, ranges or values which are taught for one element or component of the present disclosure, for example, to be preferred, more preferred or most preferred can be combined with any range or amount taught in respect of another element or component of said embodiment, irrespective of whether the range or amount taught in respect of the other element is referred to as being preferred, more preferred or most preferred etc (or simply disclosed without any such label or reference).

Since all numbers, values and/or expressions specifying quantities of materials, ingredients, reaction conditions, boiling points, molecular weights, number of carbon atoms, and the like, used herein and in the claims appended hereto, are subject to the various uncertainties of measurement encountered in obtaining such values, unless otherwise indicated, all are to be understood as modified in all instances by the term "about." As used herein, the term "about" used in conjunction with a numerical value should be understood to mean within the degree of error of an instrument that commonly would be used by one of ordinary skill in the art to measure the value in the context of the present disclosure and, more particularly, within a range of the stated value where no discernible function or property would be affected such to differ from that same function or property exhibited precisely at the stated value. The term "about" used in conjunction with a numerical value may mean that value±20%. The term "about" used in conjunction with a numerical value may mean that value±10%. The term "about" used in conjunction with a numerical value may mean that value±5%. The term "about" used in conjunction with a numerical value may mean that value±1%. The term "about" used in conjunction with a numerical value may mean that value±0.5%.

One particularly preferred embodiment of the present disclosure relates to a composition which consists of (i) adamantane, (ii) petroleum ether 40/65, (iii) cyclododecane, and (iv) isopropanol in a ratio of (i):(ii):(iii):(iv) of 3.3:87.9:8.8:22 on a weight to weight basis.

One particularly preferred embodiment of the present disclosure relates to a composition which comprises (i) adamantane, (ii) petroleum ether 40/65, (iii) cyclododecane, and (iv) isopropanol in a ratio of (i):(ii):(iii):(iv) of 3.3:87.9:8.8:22 on a weight to weight basis.

One particularly preferred embodiment of the present disclosure relates to a composition which consists of (i) adamantane, (ii) petroleum ether 40/65, (iii) cyclododecane, (iv) isopropanol and camphor in a ratio of (i):(ii):(iii):(iv):camphor of 3.3:87.9:8.8:22:1.1 on a weight to weight basis.

One particularly preferred embodiment of the present disclosure relates to a composition which comprises (i) adamantane, (ii) petroleum ether 40/65, (iii) cyclododecane, (iv) isopropanol and camphor in a ratio of (i):(ii):(iii):(iv):camphor of 3.3:87.9:8.8:22:1.1 on a weight to weight basis.

One particularly preferred embodiment of the present disclosure relates to a composition which consists of a first composition and a propellant, said first composition consisting of (i) adamantane, (ii) petroleum ether 40/65, (iii) cyclododecane, (iv) isopropanol and camphor in a ratio of (i):(ii):(iii):(iv):camphor of 3.3:87.9:8.8:22:1.1 on a weight to weight basis; wherein the ratio of said first composition to said propellant on a weight to weight basis is from 49:51 to 51:49. The propellant may be a mixture of butane:propane:isobutane, preferably a mixture of butane:propane:isobutane in a ratio of 74:23:3 on a weight to weight basis.

One particularly preferred embodiment of the present disclosure relates to a composition which comprises a first composition and a propellant, said first composition consisting of (i) adamantane, (ii) petroleum ether 40/65, (iii) cyclododecane, (iv) isopropanol and camphor in a ratio of (i):(ii):(iii):(iv):camphor of 3.3:87.9:8.8:22:1.1 on a weight to weight basis; wherein the ratio of said first composition to said propellant on a weight to weight basis is from 49:51 to 51:49. The propellant may be a mixture of butane:propane:isobutane, preferably a mixture of butane:propane:isobutane in a ratio of 74:23:3 on a weight to weight basis.

One particularly preferred embodiment of the present disclosure relates to a composition which consists of (i) adamantane, (ii) cyclopentane, (iii) cyclododecane, and (iv) ethanol in a ratio of (i):(ii):(iii):(iv) of 4:4:3:4 on a weight to weight basis.

One particularly preferred embodiment of the present disclosure relates to a composition which comprises (i) adamantane, (ii) cyclopentane, (iii) cyclododecane, and (iv) ethanol in a ratio of (i):(ii):(iii):(iv) of 4:4:3:4 on a weight to weight basis.

One particularly preferred embodiment of the present disclosure relates to a composition which consists of a first composition and a propellant, said first composition consisting of (i) adamantane, (ii) cyclopentane, (iii) cyclododecane, and (iv) ethanol in a ratio of (i):(ii):(iii):(iv) of 4:4:3:4 on a weight to weight basis; wherein the ratio of said first composition to said propellant on a weight to weight basis is from 1:1.6 to 1:1.8. The propellant may be a mixture of butane:propane:isobutane, preferably a mixture of butane:propane:isobutane in a ratio of 74:23:3 on a weight to weight basis. Alternatively, the propellant may be propane.

One particularly preferred embodiment of the present disclosure relates to a composition which comprises a first composition and a propellant, said first composition consisting of (i) adamantane, (ii) cyclopentane, (iii) cyclododecane, and (iv) ethanol in a ratio of (i):(ii):(iii):(iv) of 4:4:3:4 on a weight to weight basis; wherein the ratio of said first composition to said propellant on a weight to weight basis is from 1:1.6 to 1:1.8. The propellant may be a mixture of butane:propane:isobutane, preferably a mixture of butane:propane:isobutane in a ratio of 74:23:3 on a weight to weight basis. Alternatively, the propellant may be propane.

One particularly preferred embodiment of the present disclosure relates to a composition which consists of (i) adamantane, (ii)(a) cyclopentane, (ii)(b) petroleum ether 60-95, (iii) cyclododecane, and (iv) ethanol in a ratio of (i):(ii)(a):(ii)(b):(iii):(iv) of 4:4:3:3:4 on a weight to weight basis.

One particularly preferred embodiment of the present disclosure relates to a composition which comprises (i) adamantane, (ii)(a) cyclopentane, (ii)(b) petroleum ether 60-95, (iii) cyclododecane, and (iv) ethanol in a ratio of (i):(ii)(a):(ii)(b):(iii):(iv) of 4:4:3:3:4 on a weight to weight basis.

One particularly preferred embodiment of the present disclosure relates to a composition which consists of a first composition and a propellant, said first composition consisting of (i) adamantane, (ii)(a) cyclopentane, (ii)(b) petroleum ether 60-95, (iii) cyclododecane, and (iv) ethanol in a ratio of (i):(ii)(a):(ii)(b):(iii):(iv) of 4:4:3:3:4 on a weight to weight basis; wherein the ratio of said first composition to said propellant on a weight to weight basis is from 1:1.4 to 1:1.8. The propellant may be a mixture of butane:propane:isobutane, preferably a mixture of butane:propane:isobutane in a ratio of 74:23:3 on a weight to weight basis. Alternatively, the propellant may be propane.

One particularly preferred embodiment of the present disclosure relates to a composition which comprises a first composition and a propellant, said first composition comprising (i) adamantane, (ii)(a) cyclopentane, (ii)(b) petroleum ether 60-95, (iii) cyclododecane, and (iv) ethanol in a ratio of (i):(ii)(a):(ii)(b):(iii):(iv) of 4:4:3:3:4 on a weight to weight basis; wherein the ratio of said first composition to said propellant on a weight to weight basis is from 1:1.4 to 1:1.8. The propellant may be a mixture of butane:propane:isobutane, preferably a mixture of butane:propane:isobutane in a ratio of 74:23:3 on a weight to weight basis. Alternatively, the propellant may be propane.

One particularly preferred embodiment of the present disclosure relates to a composition which consists of (i) adamantane, (ii)(a) cyclopentane, (ii)(b) petroleum ether 60-95, and (iv) ethanol in a ratio of (i):(ii)(a):(ii)(b):(iv) of 25:93:25:42 on a weight to weight basis.

One particularly preferred embodiment of the present disclosure relates to a composition which comprises (i) adamantane, (ii)(a) cyclopentane, (ii)(b) petroleum ether 60-95, and (iv) ethanol in a ratio of (i):(ii)(a):(ii)(b):(iv) of 25:93:25:42 on a weight to weight basis.

One particularly preferred embodiment of the present disclosure relates to a composition which consists of a first composition and a propellant, said first composition consisting of (i) adamantane, (ii)(a) cyclopentane, (ii)(b) petroleum ether 60-95, and (iv) ethanol in a ratio of (i):(ii)(a):(ii)(b):(iv) of 25:93:25:42 on a weight to weight basis; wherein the ratio of said first composition to said propellant on a weight to weight basis is from 2.2:1 to 1.2:1. The propellant may be a mixture of butane:propane:isobutane, preferably a mixture of butane:propane:isobutane in a ratio of 74:23:3 on a weight to weight basis. Alternatively, the propellant may be propane.

One particularly preferred embodiment of the present disclosure relates to a composition which comprises a first composition and a propellant, said first composition consisting of (i) adamantane, (ii)(a) cyclopentane, (ii)(b) petroleum ether 60-95, and (iv) ethanol in a ratio of (i):(ii)(a):(ii)(b):(iv) of 25:93:25:42 on a weight to weight basis; wherein the ratio of said first composition to said propellant on a weight to weight basis is from 2.2:1 to 2:1. The propellant may be a mixture of butane:propane:isobutane, preferably a mixture of butane:propane:isobutane in a ratio of 74:23:3 on a weight to weight basis. Alternatively, the propellant may be propane.

As employed above, the labels (ii)(a) and (ii)(b) are simply employed to render clear the fact that, in the instances in which they are employed, more than one solvent falling under the broader definition of the (ii) first solvent of the present disclosure is employed. These are, in turn, then labelled (ii)(a) and (ii)(b) purely to impart the utmost clarity on the composition at hand. If, for example, a composition of the present disclosure comprises two different solvents falling under the broader definition of the (ii) first solvent employed elsewhere herein (and thus labelled (ii)(a) and (ii)(b)) and further reference is made in that context to, for instance, the weight ratio of (ii) to (iv), the combined weight of (ii)(a) and (ii)(b) will represent the overall weight of (ii) to be used in calculating said weight ratio of (ii) to (iv).

One particularly preferred embodiment of the present disclosure relates to a composition which consists of (i) adamantane, and (ii) petroleum ether 40/65, wherein the ratio of (i):(ii) is 1:9 on a weight to weight basis.

One particularly preferred embodiment of the present disclosure relates to a composition which comprises (i) adamantane, and (ii) petroleum ether 40/65, wherein the ratio of (i):(ii) is 1:9 on a weight to weight basis.

One particularly preferred embodiment of the present disclosure relates to a composition which consists of (i) adamantane, and (ii) petroleum ether 40/65, wherein the (i) adamantane is present in 6.25 wt. % based on the total weight of the composition.

One particularly preferred embodiment of the present disclosure relates to a composition which comprises (i) adamantane, and (ii) petroleum ether 40/65, wherein the (i) adamantane is present in 6.25 wt. % based on the total weight of the composition.

One particularly preferred embodiment of the present disclosure relates to a composition which consists of a first composition and a propellant; wherein said first composition consists of (i) adamantane, and (ii) petroleum ether 40/65, wherein the (i) adamantane is present in 6.25 wt. % based on the total weight of the said first composition; and wherein the ratio of said first composition to said propellant on a weight to weight basis is from 49:51 to 51:49. The propellant may be a mixture of butane:propane:isobutane, preferably a mixture of butane:propane:isobutane in a ratio of 74:23:3 on a weight to weight basis.

One particularly preferred embodiment of the present disclosure relates to a composition which comprises a first composition and a propellant; wherein said first composition consists of (i) adamantane, and (ii) petroleum ether 40/65, wherein the (i) adamantane is present in 6.25 wt. % based on the total weight of the said first composition; and wherein the ratio of said first composition to said propellant on a weight to weight basis is from 49:51 to 51:49. The propellant may be a mixture of butane:propane:isobutane, preferably a mixture of butane:propane:isobutane in a ratio of 74:23:3 on a weight to weight basis.

EXAMPLES

Unless stated otherwise, all synthetic processes and parameter measurements are to be understood to have been conducted at room/ambient temperature, i.e. at 21±1° C., and atmospheric pressure. Unless otherwise stated, all reagents are laboratory grade.

The Examples set forth herein below serve merely to exemplify specific embodiments of the present disclosure and in no way limit the scope of the present disclosure as claimed and described elsewhere herein.

The following mixtures (Mixtures 1 to 3) according to the present disclosure were produced by adding the adamantane and, where present, CCD and camphor in the amounts stated to the solvent(s) (petroleum ether ("Wundbenzin") 40/65 and, where present, isopropanol) and mixing/stirring together at room temperature such to produce a solution. The resultant solutions were filtered through a high density filter (paper funnel with nylon insert, 125 μm; available from carparts GmbH, Cologne, Germany under the product name Car System Multi-Strain Farbsieb VE 125 μm; Product Number V146957-VE) to produce the final Mixtures 1 to 3.

|  | Mixture 1 | Mixture 2 | Mixture 3 |
| --- | --- | --- | --- |
| Petroleum Ether 40/65 (g) | 87.9 | 120 | 630 |
| Isopropanol (g) | 22 | 0 | 0 |
| CCD (g) | 8.8 | 0 | 0 |
| Adamantane (g) | 3.3 | 8 | 70 |
| Camphor (g) | 1.1 | 0 | 0 |

Example 1

Using standard industry equipment and techniques for filling aerosol cans (cans filled at Pamasol-Swiss-Aerosol-Solutions, Switzerland), Mixture 1 was transferred via pump into industry standard 400 ml aerosol cans (65 mm diameter, 157 mm tall, 400 ml fill volume, 520 ml brim volume, 15 bar, straight wall cans available from G. Staehle GmbH u. Co. KG, Germany). The cans were then weighed to ascertain the quantity of Mixture 1 contained therein before the valve was fitted to the can, crimped and sealed following standard procedures. The cans were then pressurized with liquid propellant (butane:propane:isobutane, 74:23:3) and the final weight of the can measured in order to determine the quantity of propellant present. Finally, the can was fitted with a spray head ("Sprühkopf") (nozzle diameter 0.51 (+/−0.02) mm; available from Deutsche Prazisions-Ventil GmbH, Germany) present for activating the valve and thus releasing the composition upon depression. The final composition of Example 1 consisted of 87.9 g petroleum ether 40/65, 22 g isopropanol, 8.8 g cyclododecane, 3.3 g adamantane, 1.1 g camphor and 122.3 g of propellant.

Example 2

Using standard industry equipment and techniques for filling aerosol cans (cans filled at Pamasol-Swiss-Aerosol- Solutions, Switzerland), Mixture 2 was transferred via pump into industry standard 400 ml aerosol cans (65 mm diameter, 157 mm tall, 400 ml fill volume, 520 ml brim volume, 15 bar, straight wall can available from G. Staehle GmbH u. Co. KG, Germany). The cans were then weighed to ascertain the quantity of Mixture 2 contained therein before the valve was fitted to the can, crimped and sealed following standard procedures. The cans were then pressurized with liquid propellant (butane:propane:isobutane 74:23:3) and the final weight of the can measured in order to determine the quantity of propellant present. Finally, the can was fitted with the requisite spray head ("Sprühkopf") (nozzle diameter 0.51 (+/−0.02) mm; available from Deutsche Prazisions-Ventil GmbH, Germany) present for activating the valve and thus releasing the composition upon depression. The final composition of Example 2 consisted of 120 g petroleum ether 40/65, 8 g adamantane, and 122.3 g of propellant.

Example 3

Mixture 3 prepared as described above was transferred into a plastic container capable of being fitted with an airbrush for subsequent application of the mixture to the object to be coated.

Comparative Examples 1 to 3

The examples of the present disclosure were tested against a series of prior art, commercial and non-prior-art products. Comparative Example 1 (non-prior art product) is a solution of cyclododecane (4.6 g) in petroleum ether 40/65 (73 g) pressurized in an aerosol spray can (following the procedure for pressurization and can preparation described above for Examples 1 and 2) using 64.5 g of propellant. Comparative Example 2 is a commercially available aerosol cyclododecane spray available from the company Deffner and Johann GmbH, Germany under the product name "Cyclododecan Spray" (Product Number: 2062 400). According to available data this product contains from 25 to less than 50 weight percent cyclododecane, 25 to less than 50 weight percent propane, 25 to less than 50 weight percent butane, and 10 to less than 12.5 weight percent isobutane and comes as a pressurised aerosol spray in a standard 400 ml spray can. Comparative Example 3 is a commercially available $TiO_2$-containing pigment-based aerosol spray for 3D scanning produced by the company Helling GmbH, Germany under the product name "3-D Laserscanning Entspiegelungsspray" (Product Number: 119.990.001; 119.990.004) which further includes isopropanol, as well as n-butane, propane and isobutane propellants.

Application of the Coating Layer

The compositions of each of Examples 1 to 3 and Comparative Examples 1 to 3 were applied to the test substrate (a clear, colourless, solid glass sphere of 127.1 mm diameter) by manually applying a single, even coating layer from a distance of approximately 300 mm. In the case of each of Tests 1 to 3 below, the requisite adhesive reference dots (3 mm diameter) provided by the scanner manufacturer were applied to the test substrate in line with the instructions of the scanner manufacturer prior to application of the coating layer. Spraying was stopped when the glass surface of the sphere was no longer visible.

In the case of Examples 1 and 2 as well as Comparative Examples 1 to 3, this involved simply releasing the composition from the respective spray can by depressing the spray head (thus opening the valve) and applying the coating layer to the glass sphere as described above.

In the case of Example 3, the composition did not comprise a propellant and thus an airbrush (Tectake HVLP Lackierpistole, available from Tectake GmbH, Germany; with air pressure 1.5 barg and 0.8 mm nozzle diameter) was used to project the composition onto the glass sphere.

Tests

Each of the respective coated glass spheres was then tested for 1) whether the coating produced a surface that could be scanned, 2) the quality of the coating surface produced, 3) mar resistance, 4) the ability of reference dots/spots to adhere to the coating, 5) the ability of the dots/points to be removed without negatively affecting surface quality, 6) the ability of the dots/points to re-adhere following removal, 7) coating residence time, 8) coating formation on an oiled surface, and 9) coating durability against running water. Each of said properties was measured according to the following test procedures:

1) Scannability

This test evaluated the ability of the coated surface to enable the scanner to produce a 3D scan of the test object. The scanner used was a ATOS Triple Scan 16M Plus 29M/SO (available from GOM GmbH, Germany) mounted inside a Scanbox 5120 (available from GOM GmbH, Germany) and the scan was performed following the instructions and workflow set forth by the scanner manufacturer in the software provided with the scanner (ATOS Professional 2018, Hotfix 1, Rev. 111729, build 2018-08-22). In this context, the scanner was initially calibrated prior to conducting any scan measurements. The calibration scans were conducted following the calibration protocol set forth in the aforementioned software, the calibration sensor being an ATOS Triple Scan 16 M Plus 29M/SO sensor with a measurement volume ("Messvolumen") MV170 (170 mm×130 mm×130 mm). The calibration object was a calibration plate (Triple Scan; CP40-170-417395). The number of calibration points was 3657 and the calibration temperature was 23.2° C. The following calibration settings applied: camera lens—50.00 mm, focal length (projector)—60.00 mm, recording mode—multi-record ("Mehrfachaufnahme"), elipse quality—0.4.

The coated objects to be scanned (coated glass spheres) were prepared as described above and the scanner positioned directly in front of the particular sphere to be measured. By aligning the focal point of the scanner such that it coincided with the center of the sphere to be scanned, it was ensured that the sphere was positioned exactly in the center of the scanner's measurement volume.

A scan was then performed on the respective sphere by following the protocol set forth in the above-mentioned scanner software. Following the successful capture of a scan, the scanner was repositioned at a different angle such to cover a new area of the sphere's surface. A further scan was then performed. This procedure was repeated until the entire surface of the sphere had been scanned. The scanner software was employed to process the scan data.

A result of "yes" in the table below means that it was possible for the scanner to produce a 3D-scan of the coated object. A result of "barely" in the table below means that less than 50% of the surface could be scanned.

2) Surface Quality

The quality of the coating surface is reflected through its thickness, smoothness and homogeneity. The coating thickness was determined using an Alicona G5 surface characterisation device (available from Alicona Imaging GmbH, Germany; Product ID: A201015018, Alicona IF-frame SN: 076201502516, Alicona IF-SensorC100 Instrument G1Vb4 SN: 074201502516, Alicona IF-C100 ElectronicsUnit Vat SN: 081027011915; Software—MeasureSuite 5.3.1) and that of each Example is reported in the Table below. The same Alicona G5 device and software was used to produce visual representations of the coating surface, thus allowing the surface homogeneity and smoothness to be evaluated. Such visual representations of the coating surfaces of each of the Examples are depicted in FIGS. 1 to 6 and summarized in the Table below. A score of 1 (excellent homogeneity) to 5 (very poor homogeneity) was accorded on the basis of the degree of homogeneity observed.

3) Mar Resistance

Glass spheres coated with the respective compositions of Examples 1-3 and Comparative Examples 1-3 were produced as described above and placed on a flat surface. Each sphere was then raised from the flat surface by grasping the sphere between the fingers of one hand and held for a period of 5 seconds. The spheres were then returned to the flat surface and released from the hand. Each sphere was then visually inspected and accorded a "score" from 1 to 5 based on the marring of the surface coating which had resulted relative to its original post-spraying state.

Scores: 1=no smudging of coating upon handling and no re-treatment required prior to scanning; 3=some degree of smudging upon handling but coating layer remains to some degree intact; 5=coating immediately smudged/removed and surface quality lost upon handling.

4) Adhesion of Reference Dots/Spots

A coating of each of the respective compositions was applied to a glass sphere as described above with the exception that no reference dots were applied to the sphere prior to application of the coating composition. Rather, following application of the composition and allowing to dry to form the desired coating, the reference dots were applied to the coated surface. The applied dots were then observed over a period of 30 minutes and their initial ability to adhere/initial quality of adhesion to the coated surface and any change in the degree of adhesion over time noted.

Score: 1=dots adhere very well to coated surface and remain adhered until active removal; 2=dots adhere well to coated surface; 3=dots show average adhesion to coated surface; 4=dots exhibit minimal degree of adhesion to coated surface and detach after a short time without further interference; 5=dots do not adhere at all to coated surface.

5) Effect of Dot/Spot Removal on Surface Quality

Reference dots were applied to the surface of the coated glass spheres as described under test 4) above. The dots were then manually removed by hand being careful not to disturb the surface coating through hand contact. The area of the surface of the coating from which the reference dot had been removed was then visually inspected and accorded a "score" of 1 to 5 to reflect the quality of the remaining coating.

Scores:
1=no noticeable deterioration in quality of coated surface;
5=quality of coated surface noticeably impaired upon removal of dot 6) Ability of Dots/Spots to Re-adhere The procedure of reference dot application and removal was performed in accordance to tests 4) and 5) above. The removed dots were then reapplied to the coated surface from which they had been removed and tested for their adherence inn accordance with the procedure outlined for test 4) above.

Scores:
1=following reapplication, dots adhere very well to coated surface and remain adhered until active removal;
2=following reapplication, dots adhere well to coated surface;
3=following reapplication, dots show average adhesion to coated surface;
4=following reapplication, dots exhibit minimal degree of adhesion to coated surface and detach after a short time without further interference;
5=following reapplication, dots do not adhere at all to coated surface.

7) Residence Time

Following coating of the glass spheres with the respective compositions as outlined above, the time during which sufficient coating remained on the surface to allow a successful scan measurement to be performed following the above-described scanning procedure was determined. The results for each composition are listed in the table below. In this regard, a result of "short" corresponds to a residence time of below 45 minutes, a result of "medium" to a residence time of from 45 minutes to 24 hours or less and a result "long" to a residence time exceeding 24 hours.

8) Coating Formation on an Oiled Surface

To a metal (steel) gear wheel exhibiting a protective coating layer of lubricating oil was applied a coating of the respective compositions in the manner described above for the glass spheres and a scan measurement attempted following the protocol outlined above for test 1).

In the Table below, a result of "good" means that a coating of sufficiently quality to produce a high quality scan was produced and that the coating subsequently sublimed to leave the underlying protective oil layer intact. A result of "medium" means that a coating of sufficiently quality to produce a high quality scan was produced but, following sublimation of the coating, the underlying protective oil layer was no longer perfectly intact and had to be reapplied. A result of "poor" means that it was not possible to form a coating of sufficient quality to produce a high quality scan.

9) Coating Durability against Running Water

Glass spheres coated with each of the respective compositions were produced as described above. The coated sphere was then held under a running cold water tap such that water ran over the coated surface for a period of 10 seconds. The sphere was then removed from the flow path of the water and allowed to air dry for a period of 20 seconds. The coated surface was then visually evaluated in order to determine whether the coating had been impaired or not.

Scores (see Table below):
yes=durable against running water (coating still of sufficient quality that the generation of a high quality scan of the coated object is still possible following the procedure outlined under test 1)).
no=not durable against running water (coating no longer of sufficient quality that the generation of a high quality scan of the coated object is still possible following the procedure outlined under test 1)).

|  | Ex 1 | Ex 2 | Ex 3 | Comp Ex 1 | Comp Ex 2 | Comp Ex 3 |
| --- | --- | --- | --- | --- | --- | --- |
| Scannable | yes | yes | yes | barely | yes | yes |
| Coating Thickness (µm) | 2 | 5 | 4 | 1 | 160 | 4 |
| Surface Homogeneity | 2 | 2 | 1 | 2* | 5 | 1 |
| Mar Resistance | 1 | 1 | 1 | 3 | 5 | 5 |
| Dot Adhesion | 1 | 1 | 1 | 4 | 5 | 5 |
| Effect of Dot Removal | 1 | 1 | 1 | 5 | N/A | N/A |
| Re-Adhesion of Dots | 1 | 1 | 1 | 5 | N/A | N/A |

-continued

|  | Ex 1 | Ex 2 | Ex 3 | Comp Ex 1 | Comp Ex 2 | Comp Ex 3 |
|---|---|---|---|---|---|---|
| Residence Time | medium | short | medium | Long | Long | indefinite |
| Ability to form a high quality coating on an oiled surface | Good | Good | Good | N/A | N/A | N/A |
| Durability against running water | Yes | Yes | Yes | Yes | Yes | No |

Figure 4:
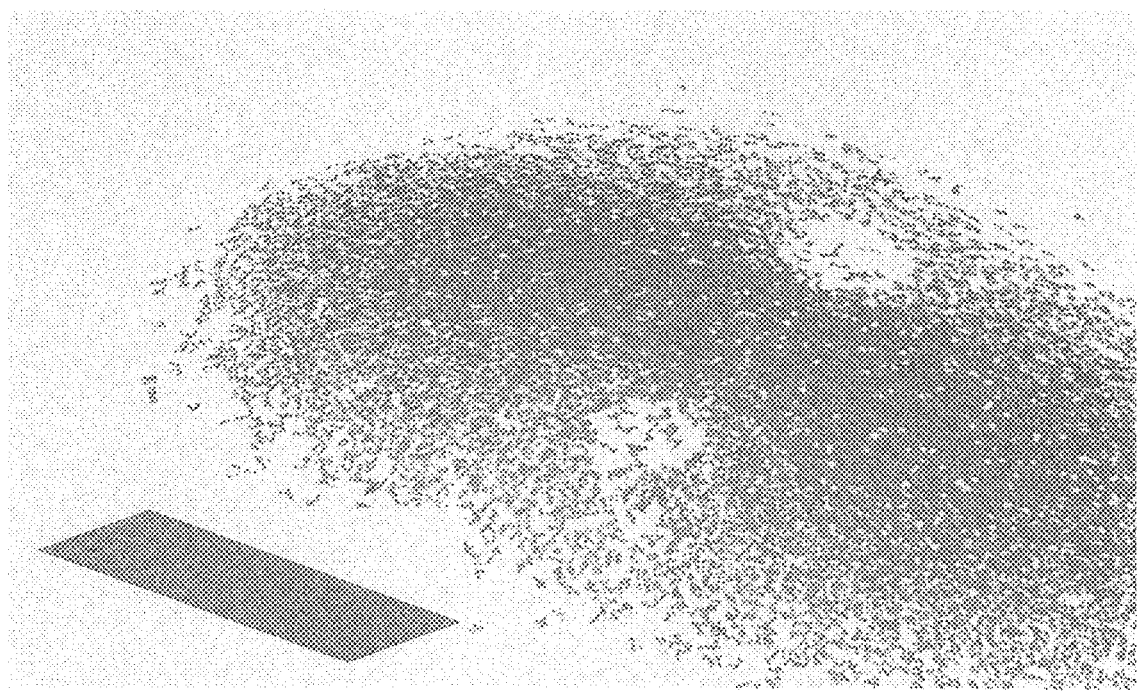
FIG. 4 represents a visual representation of the coating surface of Comparative Example 1.
Figure 5:
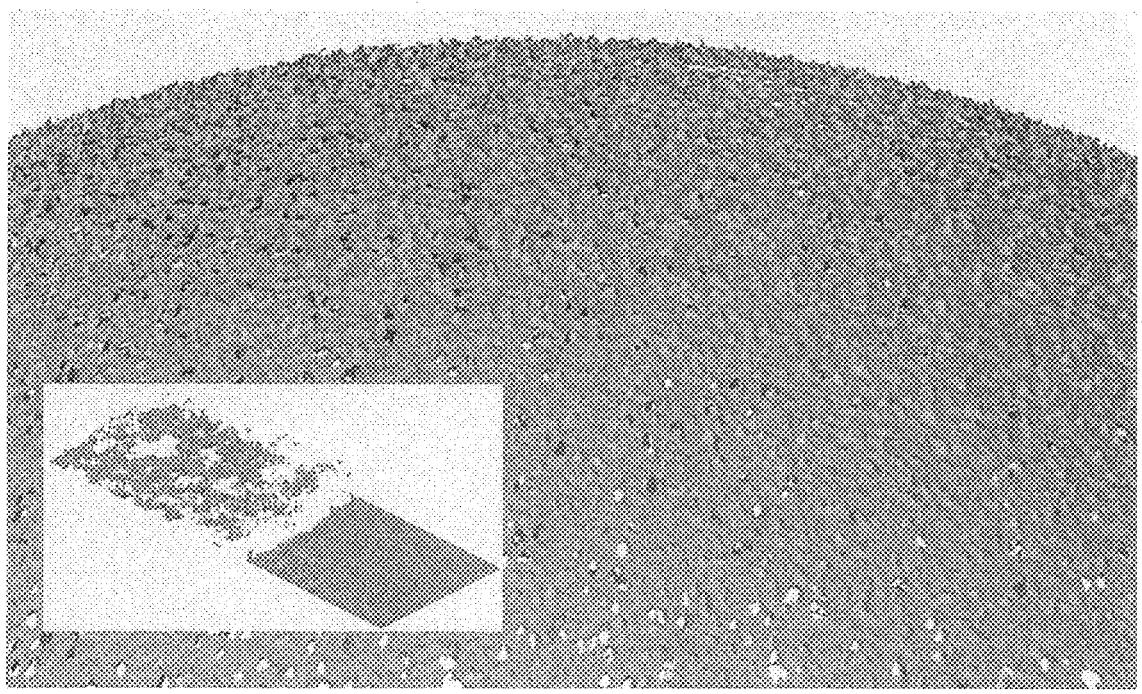
FIG. 5 represents a visual representation of the coating surface of Comparative Example 2.
Figure 6:
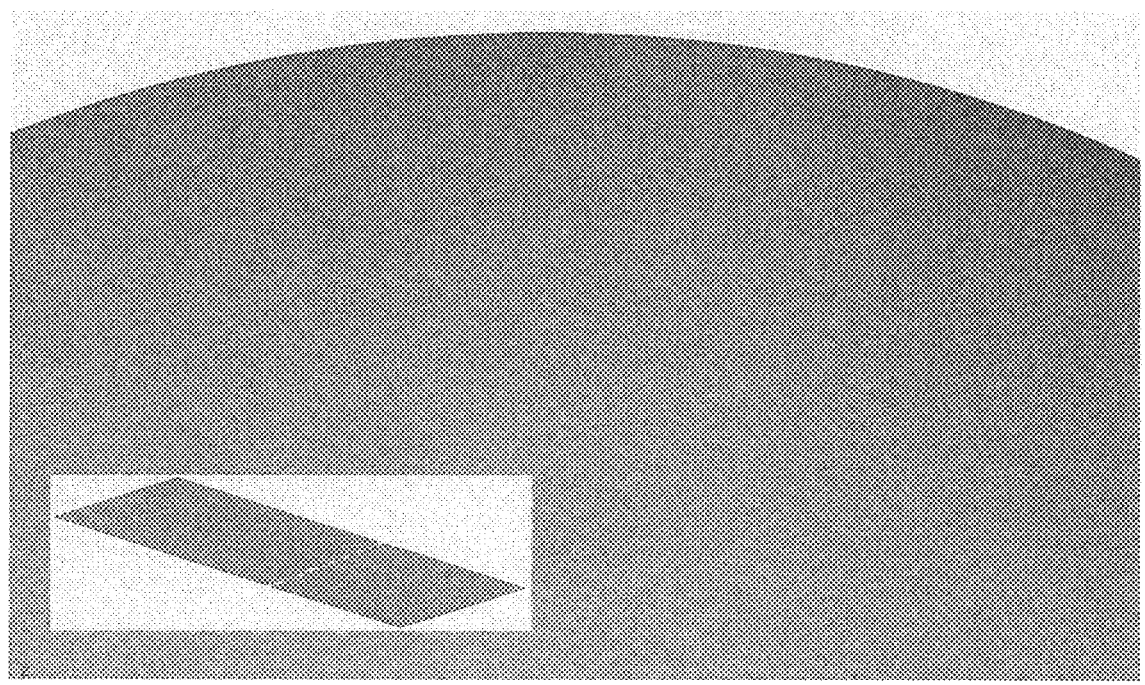
FIG. 6 represents a visual representation of the coating surface of Comparative Example 3.

*good homogeneity for the part of the surface on which a coating layer could be achieved but very poor surface coverage with the coating could be achieved (see FIG. 4)

The Figures were generated by the above-described scanner software (described above under test 2); Alicona G5 surface characterisation device; Software—MeasureSuite 5.3.1) and show, inter alia, the surface quality including smoothness and homogeneity achieved when coating glass spheres with the respective compositions of Examples 1 to 3 and Comparative Examples 1 to 3 following the coating application procedure outlined above.

The invention claimed is:

1. A composition comprising:
   (i) adamantane;
   (ii) a first solvent, wherein the first solvent is a hydrocarbon which has a boiling point of 25° C. or more at atmospheric pressure or a mixture of hydrocarbons which has a boiling point of 25° C. or more at atmospheric pressure; and
   (iii) a second solvent which is different from the first solvent; a propellant; or a combination of a second solvent and a propellant,
   wherein the total quantity of adamantane is from 0.5 wt. % to 50 wt. %, based on the total weight of all components.

2. The composition according to claim 1, wherein the first solvent has a boiling point or a boiling point range from 25° C. to 130° C., at atmospheric pressure.

3. The composition according to claim 1, wherein the first solvent is selected from the group consisting of pentane, cyclopentane, hexane, cyclohexane, heptane, cycloheptane, octane, petroleum ether, petroleum ether 30-40, petroleum ether 40-60, petroleum ether 40-65, petroleum ether 60-80, petroleum ether 80-100, and any combination thereof.

4. The composition according to claim 1, wherein the total quantity of adamantane is from 1.5 wt. % to 20 wt. %, based on the total weight of all components.

5. The composition according to claim 1, further comprising cyclododecane.

6. The composition according to claim 5, wherein the ratio of adamantane to cyclododecane on a weight to weight basis is from 95:5 to 1:2.7.

7. The composition according to claim 1, further comprising cyclododecane, and wherein the total combined quantity of adamantane and cyclododecane is from 9.0 wt. % or more to 11.0 wt. % or less.

8. The composition according to claim 7, wherein the total combined quantity of adamantane and cyclododecane is from 9.5 wt. % or more to 10.5 wt. % or less, based on the total weight of all components.

9. The composition according to claim 1, wherein the composition comprises a second solvent which is different from the first solvent, and wherein the second solvent is more polar than the first solvent.

10. The composition according to claim 9, wherein the second solvent is more polar than the first solvent and the second solvent has a boiling point or boiling point range from 40° C. to 160° C., at atmospheric pressure.

11. The composition according to claim 1, wherein the second solvent is one or more alcohols.

12. The composition according to claim 11, wherein the second solvent is selected from a group consisting of methanol, ethanol, n-propanol, iso-propanol, cyclopropanol, n-butanol, sec-butanol, iso-butanol, Cert-butanol, cyclobutanol, n-pentanol, 3-methylbutan-1-ol, 2-methylbutan-1-ol, 2,2-dimethylpropan-1-ol, pentan-3-ol, pentan-2-ol, 3-methylbutan-2-ol, 2-methylbutan-2-ol, cyclopentanol, hexan-1-ol, hexan-2-ol, hexan-3-ol, 2-methylpentan-1-ol, 3-methylpentan-1-ol, 4-methylpentan-1-ol, 2-methylpentan-2-ol, 3-methylpentan-2-ol, 4-methylpentan-2-ol, 2-methylpentan-3-ol, 3-methylpentan-3-ol, 2,2-dimethylbutan-1-ol, 2,3-dimethylbutan-1-ol, 3,3-dimethylbutan-1-ol, 2,3-dimethylbutan-2-ol, 3,3-dimethylbutan-2-ol, 2-ethylbutan-1-ol, cyclohexanol, 2-heptanol, 3-heptanol, 4-heptanol, and any combination thereof.

13. The composition according to claim 1, wherein a ratio of the first solvent to the second solvent on a weight to weight basis is from 99:1 to 1:99.

14. The composition according to claim 13, wherein the ratio of the first solvent to the second solvent on a weight to weight basis is from 90:10 to 10:90.

15. The composition according to claim 1, further comprising one or more additives selected from camphor, menthol and combinations thereof, in a quantity from 0.1 wt. % or more to 5 wt. % or less.

16. The composition according to claim 15, wherein the one or more additives is in a quantity from 0.25 wt. % or more to 2.5 wt. % or less.

17. The composition according to claim 1, further comprising a propellant.

18. The composition according to claim 17, wherein the propellant is present in an amount from 20 wt. % or more to 80 wt. % or less.

19. A method of producing a 3D scan of an object, comprising the steps of:
   1) applying a composition according to claim 16 to the surface of the object to be scanned; and
   2) performing a 3D scan measurement.

* * * * *

UNITED STATES PATENT AND TRADEMARK OFFICE
CERTIFICATE OF CORRECTION

| | | |
|---|---|---|
| PATENT NO. | : 12,037,515 B2 | Page 1 of 1 |
| APPLICATION NO. | : 17/290295 | |
| DATED | : July 16, 2024 | |
| INVENTOR(S) | : Max Michael Ruhfus et al. | |

It is certified that error appears in the above-identified patent and that said Letters Patent is hereby corrected as shown below:

In the Claims

Column 48, Line 21, Claim 12, delete "Cert-butanol," and insert -- tert-butanol, --

Column 48, Line 53, Claim 19, delete "claim 16" and insert -- claim 1 --

Signed and Sealed this
Twenty-fourth Day of September, 2024

*Katherine Kelly Vidal*

Katherine Kelly Vidal
*Director of the United States Patent and Trademark Office*